United States Patent
Arumugam et al.

(10) Patent No.: US 9,625,247 B2
(45) Date of Patent: Apr. 18, 2017

(54) SYSTEMS AND METHODS FOR POSITION TRACKING USING MAGNETOQUASISTATIC FIELDS

(71) Applicants: Disney Enterprises, Inc., Burbank, CA (US); Carnegie Mellon University, Pittsburgh, PA (US)

(72) Inventors: Darmindra D. Arumugam, Pasadena, CA (US); Matthew Trotter, Atlanta, GA (US); Joshua Griffin, Nampa, ID (US); David Ricketts, Cary, NC (US); Daniel Stancil, Raleigh, NC (US)

(73) Assignee: Disney Enterprises, Inc., Burbank, CA (US)

( * ) Notice: Subject to any disclaimer, the term of this patent is extended or adjusted under 35 U.S.C. 154(b) by 15 days.

(21) Appl. No.: 14/290,156

(22) Filed: May 29, 2014

(65) Prior Publication Data
US 2014/0266164 A1 Sep. 18, 2014

Related U.S. Application Data

(63) Continuation-in-part of application No. 14/043,481, filed on Oct. 1, 2013, now abandoned, and a
(Continued)

(51) Int. Cl.
*G01B 7/004* (2006.01)
*A63B 43/00* (2006.01)
(Continued)

(52) U.S. Cl.
CPC ............ *G01B 7/004* (2013.01); *A63B 43/004* (2013.01); *A63B 2041/005* (2013.01); *A63B 2220/12* (2013.01); *A63B 2220/16* (2013.01); *A63B 2225/50* (2013.01); *A63B 2243/007* (2013.01); *A63B 2243/0025* (2013.01); *G01D 5/145* (2013.01)

(58) Field of Classification Search
None
See application file for complete search history.

(56) References Cited

U.S. PATENT DOCUMENTS 3,883,873 A * 5/1975 Mosyakov et al. ........... 342/385
4,041,494 A * 8/1977 Ewen et al. .................. 342/458
(Continued)

FOREIGN PATENT DOCUMENTS

FR 2760551 A1 * 9/1998 ......... A63B 24/0021

OTHER PUBLICATIONS

"Summary of Image Theory Expressions for the Quasi-Static Fields of Antennas at or Above the Earth's Surface" By Peter R. Bennister. 1979.*

*Primary Examiner* — Paresh Patel
(74) *Attorney, Agent, or Firm* — Ference & Associates LLC

(57) ABSTRACT

Embodiments of the invention broadly contemplate systems, methods, apparatuses and program products that provide position tracking using a simple, low frequency oscillator that is attached to an object to be tracked, and one or more receiving stations that are placed around the area in which the object moves. Embodiments of the invention enable position tracking of the object using light weight equipment which minimally impacts the object's natural state.

16 Claims, 17 Drawing Sheets

Related U.S. Application Data continuation-in-part of application No. 12/824,894, filed on Jun. 28, 2010.

(51) Int. Cl.
 *A63B 41/00* (2006.01)
 *G01D 5/14* (2006.01)

(56) References Cited

U.S. PATENT DOCUMENTS

| | | | | |
|---|---|---|---|---|
| 4,297,700 | A | * | 10/1981 | Nard et al. .................... 342/125 |
| 5,572,119 | A | * | 11/1996 | Taylor ...................... 324/207.16 |
| 5,913,820 | A | * | 6/1999 | Bladen .................... A61B 5/06 |
| | | | | 128/899 |
| 5,963,163 | A | * | 10/1999 | Kemkemian et al. ........ 342/109 |
| 2001/0001430 | A1 | * | 5/2001 | Ely et al. .................... 178/18.03 |
| 2002/0093331 | A1 | * | 7/2002 | Rochelle ............ G08B 21/0263 |
| | | | | 324/247 |
| 2005/0143199 | A1 | * | 6/2005 | Saroyan ............. A63B 71/0605 |
| | | | | 473/438 |
| 2009/0009410 | A1 | * | 1/2009 | Dolgin ................ G01C 21/165 |
| | | | | 343/703 |

* cited by examiner

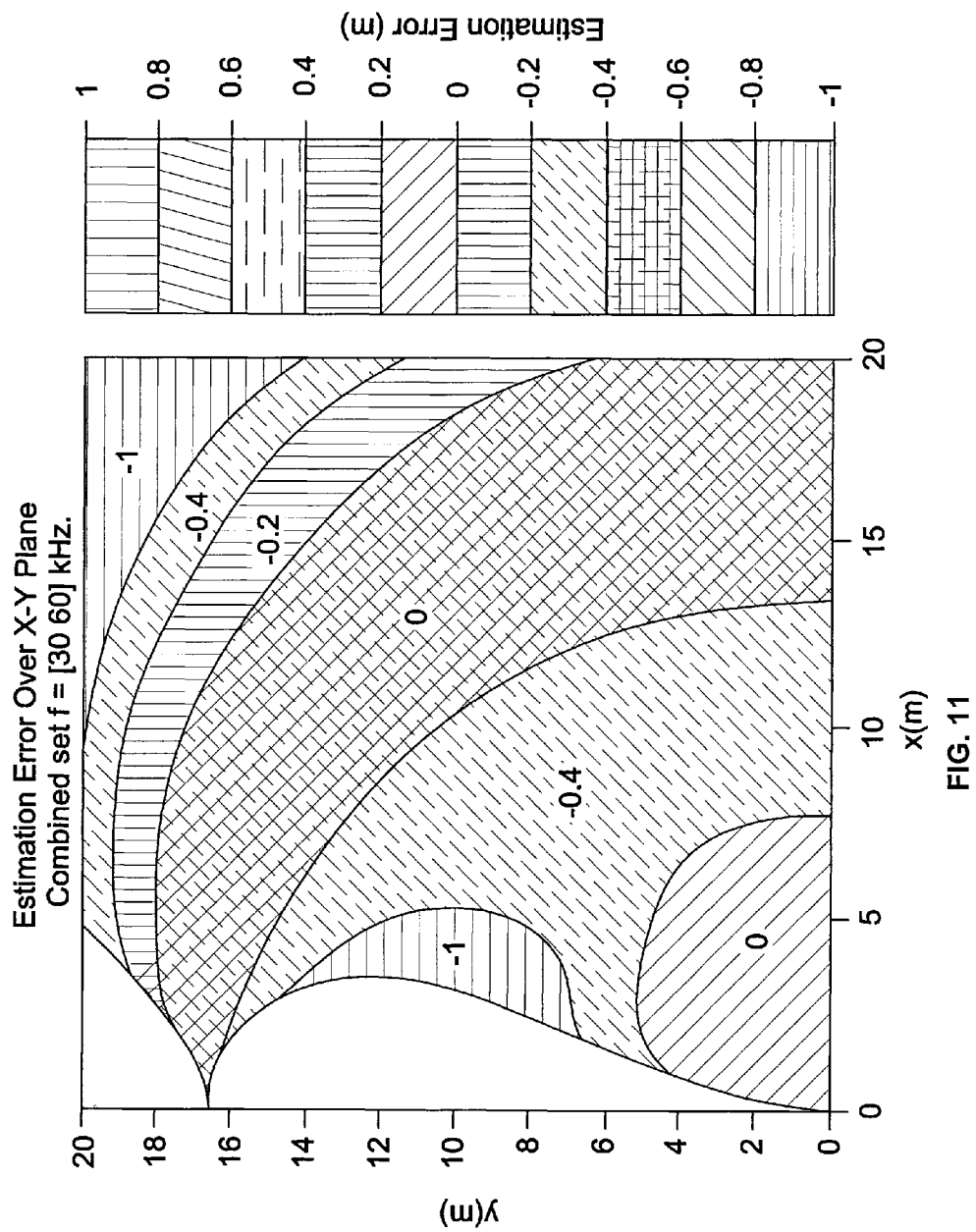

SYSTEMS AND METHODS FOR POSITION TRACKING USING MAGNETOQUASISTATIC FIELDS

CROSS-REFERENCE TO RELATED APPLICATIONS

This application is a continuation-in-part of U.S. patent application Ser. No. 14/043,481, filed on Oct. 1, 2013 and entitled "SYSTEM AND METHODS FOR POSITION TRACKING USING MAGNETOQUASISTATIC FIELDS", and a continuation-in-part of U.S. patent application Ser. No. 12/824,894, filed on Jun. 28, 2010, entitled "SYSTEM AND METHODS FOR POSITION TRACKING USING MAGNETOQUASISTATIC FIELDS"; the contents of each prior application are incorporated by reference herein.

BACKGROUND

The subject matter described herein is generally directed to systems, methods, apparatuses and program products for tracking the movement of objects, with some examples particularly focusing on relatively small objects such as game-play objects (for example, a football or a soccer ball). Although previous work has established a variety of tracking systems, these tracking systems do not provide adequate tracking in certain respects.

Some previously developed tracking systems include global positioning systems (GPS), ultra-wideband systems (UWB), wireless network infrastructure systems, beacon systems, and low-frequency systems. However, the inventors have recognized that each of these tracking systems and the state of the art have significant limitations rendering them inadequate for tracking objects as contemplated herein.

BRIEF SUMMARY

Aspects of the invention broadly provide systems, methods, apparatuses and program products for tracking objects with a simple, low frequency oscillator. Embodiments of the invention provide one or more receiving stations that are placed around the area in which the object moves. Embodiments of the invention allow position/orientation tracking of the object by detecting the magnetoquasistatic fields emitted by the simple, low frequency oscillator that is attached to the object.

In summary, one aspect of the invention provides a system comprising: one or more processors; a receiving module configured to receive one or more inputs derived from an emitter configured to emit quasistatic magnetic fields; and a program storage device tangibly storing a program of instructions executable by the one or more processors, the program of instructions comprising: computer readable program code configured to utilize the one or more inputs to determine an above ground position of said emitter utilizing complex image theory.

Another aspect of the invention provides an apparatus comprising: an oscillator configured to emit quasistatic magnetic fields suitable for position location and tracking; said oscillator being configured to weigh approximately 1 oz or less.

Yet another aspect of the invention provides a method comprising: receiving one or more inputs derived from an emitter configured to emit quasistatic magnetic fields; and utilizing the one or more inputs to determine an above ground position of said emitter utilizing complex image theory.

A further aspect of the invention provides a computer program product comprising: a computer readable storage medium having computer readable program code embodied therewith, the computer readable program code comprising: computer program code configured to receive one or more inputs derived from quasistatic magnetic field data emitted from a low frequency emitter; and computer readable program code configured to utilize the one or more inputs to determine an above ground position of said emitter utilizing complex image theory.

For a better understanding of example embodiments of the invention, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 11 illustrates estimation error in the x-y plane for averaged frequencies according to an embodiment of the invention.

DETAILED DESCRIPTION

Figure 1:
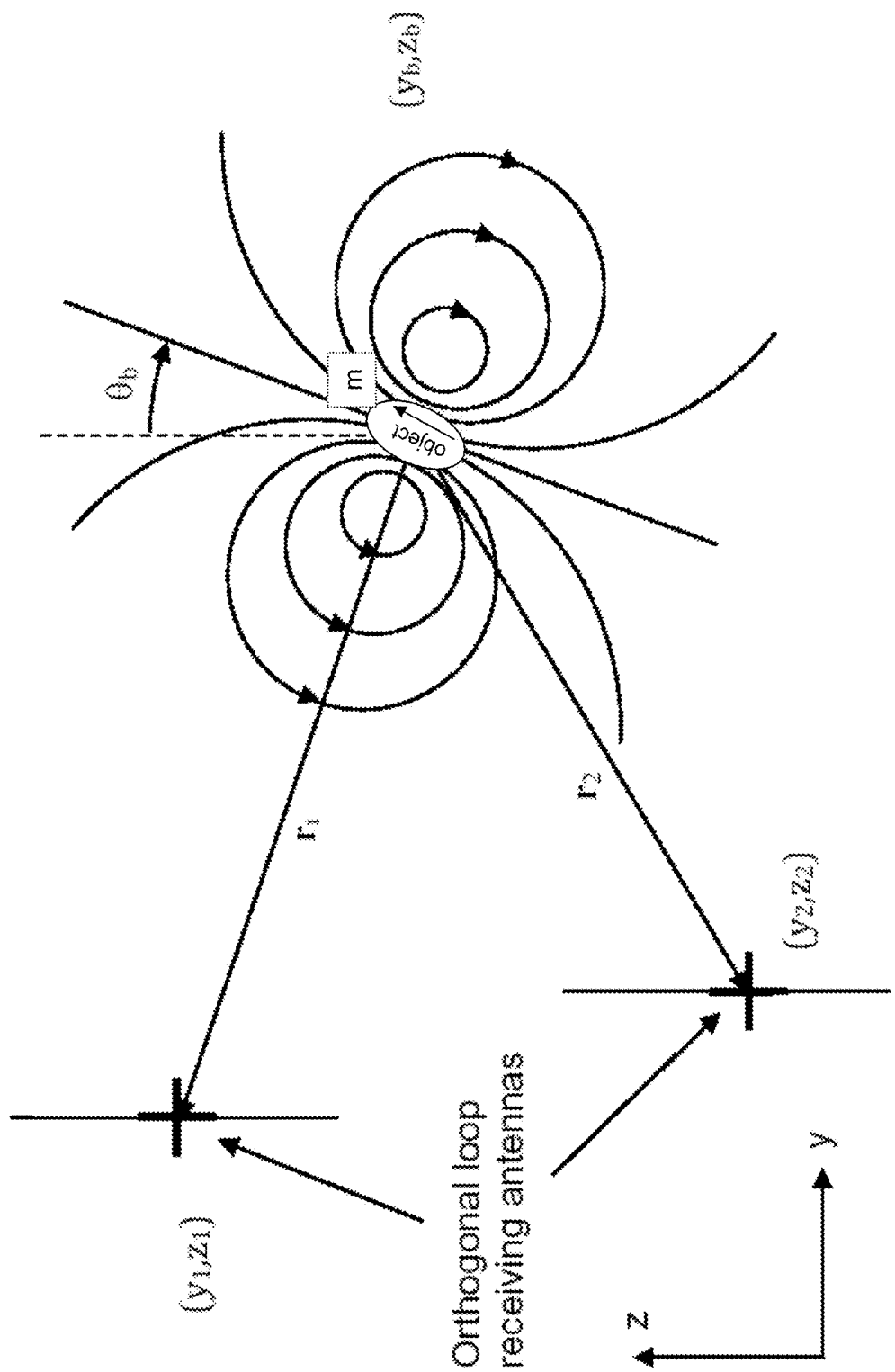
FIG. 1 illustrates a high level view of example geometry of a position and orientation tracking system according to an embodiment of the invention.

It will be readily understood that the components of the embodiments of the invention, as generally described and illustrated in the figures herein, may be arranged and designed in a wide variety of different configurations in addition to the described example embodiments. Thus, the following more detailed description of the embodiments of the invention, as represented in the figures, is not intended to limit the scope of the invention, as claimed, but is merely representative of selected example embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obfuscation.

Regarding the embodiments of the invention described herein, it should be noted that tracking the movement of objects (for example, athletes or game-play objects in use) is of interest for many reasons, including technical and entertainment reasons. As just one non-limiting example, tracking the movements of athletes (or the game-play objects they use, such as a football) would provide a capability that could be used to analyze and improve a player's technique, verify winners in races, check referee calls, and create replays. Moreover, accurately tracking the location of objects used in game-play, such as a football or soccer ball, is desirable for play visualization.

The inventors have recognized that what is needed is a device that is sufficiently small and lightweight and that gives high accuracy both indoors and outdoors, within suitable ranges. For example, in the context of game-play, what is needed is a device that the athlete is not encumbered by wearing, but provides suitable signals for tracking up to and including the size of soccer and football fields on which the game-play takes place. The size and weight constraints are even more critical for instrumentation of items used by athletes during game-play (for example, footballs and soccer balls), since the presence of the device must not noticeably affect their weight or dynamics. The size of the device must be within the tolerances established by various athletic organizations for the game-play objects (for example, 1 oz for an American football used in the National Football League).

The following paragraphs outline a few existing position location technologies that the inventors have recognized do not allow for position tracking as described herein. Thus, in order to appreciate more fully the exemplary embodiments of the invention as described herein, the following notable features and deficiencies of existing position tracking systems, as identified by the inventors, should be considered.

First consider global positioning systems (GPS). For outdoor position location, GPS is an obvious candidate. Real-time kinematic (RTK) differential GPS systems can give dynamic accuracy on the centimeter level. However, in locations where much of the sky is obstructed by buildings, or indoors, it is not possible to obtain the necessary satellite signals. Further, in many cases, the size and weight of the device could hinder the performance of the athlete or the game-play object. Use of GPS on balls, or other items used in game-play, is further complicated by the need to maintain satellite signals when the line-of-sight (LOS) is blocked by other athletes, and when the ball is spinning, et cetera. In fact, all conventional systems that determine distance using propagating waves will be affected by the lack of a line-of-sight between the transmitter and the receiver. Accordingly, the inventors have recognized that existing GPS systems are unsuitable to achieve position tracking, as discussed herein.

Next consider ultra-wideband (UWB) systems which utilize UWB technology. UWB technology can also be used for dynamic position location. However, because of severe power limitations imposed by the (United States) Federal Communications Commission (FCC), it is best suited for short-range indoor tracking. Moreover, proximity to lossy bodies (such as the human body), performance deterioration in non-line-of-sight environments, and size and weight constraints are also concerns with this technology. Accordingly, the inventors have recognized that UWB systems are unsuitable to achieve position tracking, as discussed herein.

Next consider wireless network infrastructure systems. Much attention has been given to position location techniques using existing infrastructure, such as signals from WiFi access points, or cellular base stations. These techniques generally use time differences of arrival (TDOA) from multiple base stations, and/or comparisons of signal strengths from multiple base stations. TDOA techniques use multi-lateration to determine location, while signal strength methods are usually based on "finger-printing" techniques. With finger-printing techniques, the detailed signal environment is measured throughout the space, and the device correlates its measurements with the known map to estimate position.

Realistic accuracy for TDOA techniques on a cellular scale are indicated by the E911 phase II accuracy requirement of 100 m for ⅔ of calls using network-based techniques. Position location techniques in buildings using WiFi signal strength can be on the order of a few meters, but owing to propagation effects at 2.4 GHz and 5-6 GHz, it is anticipated that the signal strength map would be strongly affected by the presence and movement of people. Accordingly, the inventors have recognized that existing network infrastructure systems are unsuitable to achieve position tracking, as discussed herein.

Next consider beacon systems. A position location technique used for many years in aviation is VOR, or VHF Omnidirectional Range navigation system. This system relies on directional radio beams transmitted from beacons.

Each beam has a unique coding, so that the aviator can determine the direction of each beacon, permitting his/her position to be determined using triangulation. The system is based on having LOS paths to the beacons, and antennas with narrow beams at the beacons. However, LOS paths cannot be guaranteed in certain contexts (for example, sporting events), and situations of particular interest to the inventors (for example, determining the location of a football when it is not visible owing to a pile-on of players) would not have a guaranteed LOS path. Accordingly, the inventors have recognized that existing beacon systems are unsuitable to achieve position tracking, as discussed herein.

Finally, consider low-frequency systems (that is, systems utilizing the low frequency band). One of the earliest radio location techniques is LORAN (LOng Range Aid to Navigation), used for maritime navigation. This system is based on TDOA from multiple beacons, but differs from the cellular infrastructure in that it uses frequencies in the Low Frequency (LF) band near 100 kHz. The low frequency makes it possible to cover large areas with many fewer base stations than would be required at cellular frequencies. The accuracy of this system is typically better than ¼ nautical mile. However, a similar system operating at 1.8 MHz over an area of roughly 50×80 km$^2$ was shown to have an accuracy of better than 10 m.

Use of lower frequencies has also been used with success in buildings, where meter-scale accuracy was demonstrated using a wavelength comparable to the building dimensions, and location was determined using signal strength fingerprinting techniques. Other more recent techniques using low-frequency phase difference between the electric and magnetic field in the near field has yielded a mean accuracy of 30 cm for ranges up to 70 m in an outdoor environment (about 4 m accuracy up to 70 m in an indoor environment) at 1.3 MHz. Again, the inventors have recognized that existing low-frequency systems are unsuitable to achieve position tracking, as discussed herein. One reason for this is that systems that use the electric field to determine distance will be affected by the human body because of its large relative permittivity. While the human body does have a magnetic response, it is very small and will have a minimal effect on the position calculation. Companies such as Polhemus and Ascension offer magnetic tracking systems, but the limited range of these systems precludes their use for the position tracking, as discussed herein.

Low-frequency localization systems are also used to rescue avalanche victims buried in the snow (e.g., ARVA avalanche beacons). In such systems, the person to be rescued wears a low-frequency emitter and the rescuer searches for the buried victim using a hand-held receiver. Localizing the buried individual requires that the hand-held receiver sense the magnetic field from the emitter and be moved, often along a line of magnetic flux, towards the emitter. Although the frequency used in such systems is similar to that described in this invention, the localization technique is different and unsuitable to achieve position tracking, as discussed herein. The avalanche localization technique is designed to localize a stationary emitter using a mobile receiver. The system described in this invention, on the other hand, is designed to locate a moving emitter using receivers with known location and orientation. Furthermore, since the handheld receiver in the avalanche system is progressively moved towards the emitter, high position accuracy at long distances is not required. This invention, however, accounts for the presence of the earth to achieve acceptable accuracy at long distances.

Accordingly, embodiments of the invention broadly contemplate systems, methods, apparatuses and program products that provide a simple, low frequency oscillator configured to attach to an object to be tracked (for example, an athlete or gameplay object). The term "low frequency" as used in discussing embodiments of the invention should be understood to mean a relatively low frequency on the order of 1 MHz or below, not necessarily a frequency in the low frequency band. One or more receiving stations are placed around the area in which the object moves (for example, a playing field or court). With a low frequency oscillator, the object's position and orientation can be tracked with accuracy and precision, including real time tracking.

As a non-limiting example consistent with the embodiments of the invention, as claimed, here below is described an implementation for tracking an American football. This is used as a non-limiting example, and it will be readily understood by those having ordinary skill in the art that similar systems can be realized for tracking other objects or items used in a wide variety of contexts, including a wide variety of game-play contexts (for example, soccer balls and/or athletes in other sports, et cetera).

An advantage of the use of low frequencies (typically below 1 MHz) is that a loop antenna on the object to be tracked (for example, an American football) can create a quasistatic magnetic field over a significant area, hence increasing the range of the system. To realize a quasistatic magnetic field, the distance to be measured needs to be much smaller than a wavelength, for example, distance<($\lambda$(wavelength)/8). On the other hand, the induced voltage signal in the receiving antennas will be proportional to frequency. Hence, it is generally desirable to use the highest frequency consistent with the quasistatic condition for a specific application range, although FCC regulations and potential sources of interference must also be considered. In many tracking applications, the range of frequencies for an ideal system is typically within 50 kHz and 1 MHz.

Moreover, since the human body does not exhibit strong magnetic responses, the presence and behavior of the magnetic field will not be significantly affected by the presence of people blocking the LOS. Embodiments of the invention utilizing this scheme also minimize the complexity of the (emitter) electronics needed on the object (for example, an American football), reducing its size and weight. In fact, it is possible to realize a system with an emitter weight on the order of 1 oz or less, allowing it to be used for example as a counter-balance to a ball's air valve, or its laces, et cetera. As a non-limiting example, the loop antenna according to an embodiment of the invention consists of multiple turns of wire around the middle of the object (for example, an American football), sandwiched between the interior air bladder and the exterior leather cover. (It should be noted that "emitter" and "oscillator" and "transmitter" are used interchangeably herein).

The oscillator may be powered by one or more batteries or ultracapacitors, allowing the ball to be recharged using inductive coupling through the resonant loop antenna without modifying or changing the object in any way. Moreover, a more "passive" emitter is possible. For example, there are two distinct techniques by which the emitter can take on a passive characteristic. First, the emitter can be configured to harvest energy (vibration, solar, et cetera). Second, the emitter can be configured to wirelessly receive energy through magnetic induction from a base station to charge its battery/capacitor/et cetera, and to power-up the oscillator. The second technique may be very useful for applications in close proximity/short range, for example within a few meters. This is the range that is currently used for magnetic induction systems used in motion capture techniques, for example. The benefit of the second technique over the existing motion capture techniques would clearly be the fact that an active emitter would not be required, thus battery charge/lifetime will not be an issue.

It is important to emphasize that the magnetic fields created by the emitter would be those of a magnetic dipole, and would not contain significant propagating components. Consequently, the rapid signal variations observed on conventional wireless signals (for example, multi-path fading) would not occur, and the position and orientation of the object can be deduced by measuring the magnitude and direction of fields produced.

The fields from the emitter are detected by receivers attached to loop antennas that would typically be, for example, from 1 to 2 m in diameter. Loops such as these are sensitive to magnetic field components that are perpendicular to the plane of the loop. By placing two loops perpendicular to one another with their axes parallel to the ground, the two orthogonal, in-plane components of the magnetic field can be measured. The receiving loops are also connected to filters, low-noise amplifiers, and other necessary electronics for measuring the strength of the field component with the highest necessary sensitivity and accuracy.

The description now turns to the figures and select example embodiments of the invention will be described. The following description of various embodiments of the invention is presented to highlight certain aspects of the invention, and the scope of the invention will be pointed out in the appended claims.

Regarding the figures, the diagrams in the figures illustrate the architecture, functionality, and operation of possible implementations of systems, methods, apparatuses and computer program products according to various embodiments of the invention. In this regard, each feature in the figures may represent functionality that can be implemented using a module, segment, or portion of code, which comprises one or more executable instructions for implementing the specified logical function(s). It should also be noted that, in some alternative implementations, the functions noted may occur out of the order noted in the figures. It will also be noted that each functionality illustrated in the figures can be implemented by special purpose hardware-based systems that perform the specified functions or acts, or combinations of special purpose hardware and computer instructions.

A basic principle underlying embodiments of the invention is shown in FIG. 1. Restricting the description to location and orientation within a plane for simplicity, the quantities to be determined are $(y_b, z_b, \theta_b)$ where $(y_b, z_b)$ are the coordinates of the ball, and $(\theta_b)$ is its orientation with respect to the z axis. Thus, a minimum of three independent measurements are needed to determine these quantities. Using orthogonal loop antennas as shown, each pair of loops gives measurements of two orthogonal field components, for a total of 4 independent measurements. This is more than enough information to solve for the three unknowns. The use of additional loops or loop pairs gives further redundancy that can be used to improve the accuracy of the position and orientation measurements.

To make this description more quantitative, the magnetic field from a static magnetic dipole is given by $$\vec{H} = \frac{1}{4\pi r^3}[3(\vec{m}\cdot\hat{r})\hat{r} - \vec{m}] \quad (1.1)$$

where $\vec{m}$ is the magnetic moment vector and $\vec{r}=r\hat{r}$ is a vector from the dipole to the point of observation. Restricting the description to the coordinate system in FIG. 1, equation (1.1) can be re-written to $$\vec{H}(y, z; y_b, z_b, \theta_b) = \frac{1}{4\pi r^3}[3(\vec{m}\cdot\hat{r})\hat{r} - \vec{m}] \quad (1.2)$$

where $$\vec{m} = INA[\hat{y}\sin\theta_b + \hat{z}\cos\theta_b] \quad (1.3)$$

$$r = \sqrt{(y-y_b)^2 + (z-z_b)^2}, \quad (1.4)$$

and $$\hat{r} = \frac{\hat{y}(y-y_b) + \hat{z}(z-z_b)}{r} \quad (1.5)$$

Here I is the current in the coil on the ball, N is the number of turns in the coil, A is the cross-sectional area of the coil, $(y_b, z_b)$ is the location of the ball, $\theta_b$ is the angle of the ball with respect to the z axis, and (y, z) is the location of the observation point.

If $H_y^m(y_1, z_1)$ is the measured y component of the field at location $(y_1, z_1)$, then the position and orientation of the football $(y_b, z_b, \theta_b)$ is completely determined by the set of simultaneous nonlinear equations $$H_y^m(y_1,z_1)=H_y(y_1,z_1;y_b,z_b,\theta_b), \quad (1.6)$$

$$H_z^m(y_1,z_1)=H_z(y_1,z_1;y_b,z_b,\theta_b), \quad (1.7)$$

$$H_y^m(y_2,z_2)=H_y(y_2,z_2;y_b,z_b,\theta_b), \quad (1.8)$$

where the functions on the right-hand-side are the components of the vector given by equation (1.2).

In the event that field measurements are available from multiple sensing locations, the location and orientation can be obtained by minimizing an error metric such as $$\varepsilon = \sum_{\substack{i=y,z \\ j=1:N}} [H_i^m(y_j, z_j) - H_i(y_j, z_j; y_b, z_b, \theta_b)]^2. \quad (1.9)$$

Some generalizations of the basic principle illustrated above consistent with example embodiments of the invention described herein are now introduced. A straightforward mathematical extension of the formulation described above is to use three orthogonal loop antennas at each receiving location to measure all three components of the magnetic field, and to place the receiving antennas at a variety of locations in three dimensions to permit orientation and localization in three dimensions. In this case, there are five unknowns which, in principle, can be uniquely determined by five independent measurements. However, the accuracy will be improved by combining multiple redundant measurements and by minimizing a cost function similar to equation (1.9), but generalized to three position coordinates and two orientation angles. In general, the orthogonal antennas need not be co-located. Presently it is preferred that a minimum of six antennas be employed for tracking using the American football implementation, with orthogonal antennas arrayed substantially evenly about the football field perimeter such that the received signal at each antenna is unique and therefore independently useful. Depending upon the signal strength of the emitter employed, more than six antennas may be necessary to cover an entire football field.

A second generalization is to include multiple antennas in the emitter. Since the coupling between an emitter antenna and a receiver antenna depends on their relative orientation, using multiple, collocated antennas (each with a different orientation) in the emitter increases the number of emitter/transmitter antenna pairs that have a strong coupling. The increase number of strongly coupled antenna pairs will increase the accuracy of the systems position and orientation estimates.

Figure 2A:
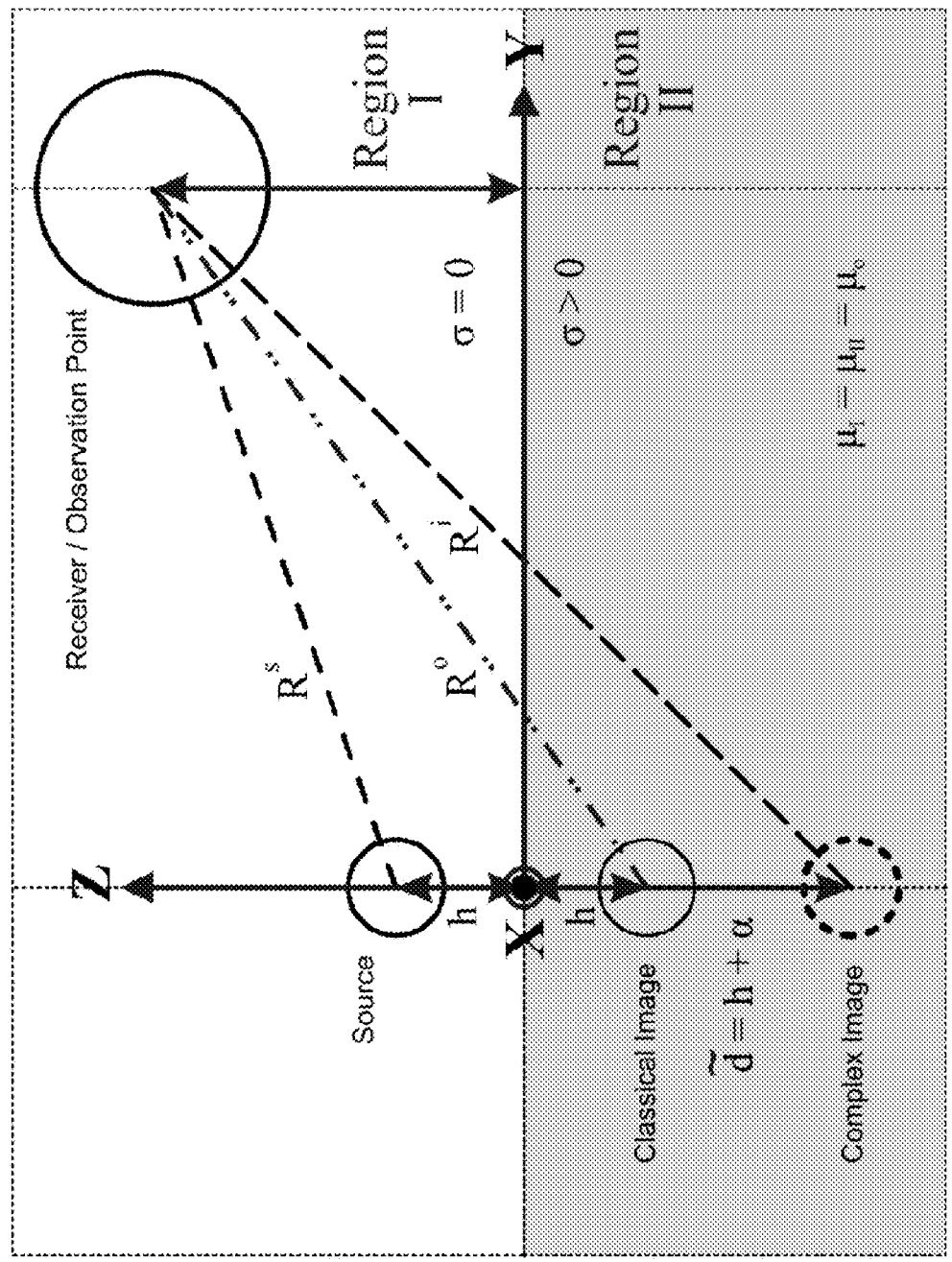
FIG. 2A illustrates one-dimensional complex image theory (CIT) employed in the tracking of an electrically small loop antenna (or magnetic dipole) above the earth with finite conductivity according to an embodiment of the invention.
Figure 2B:
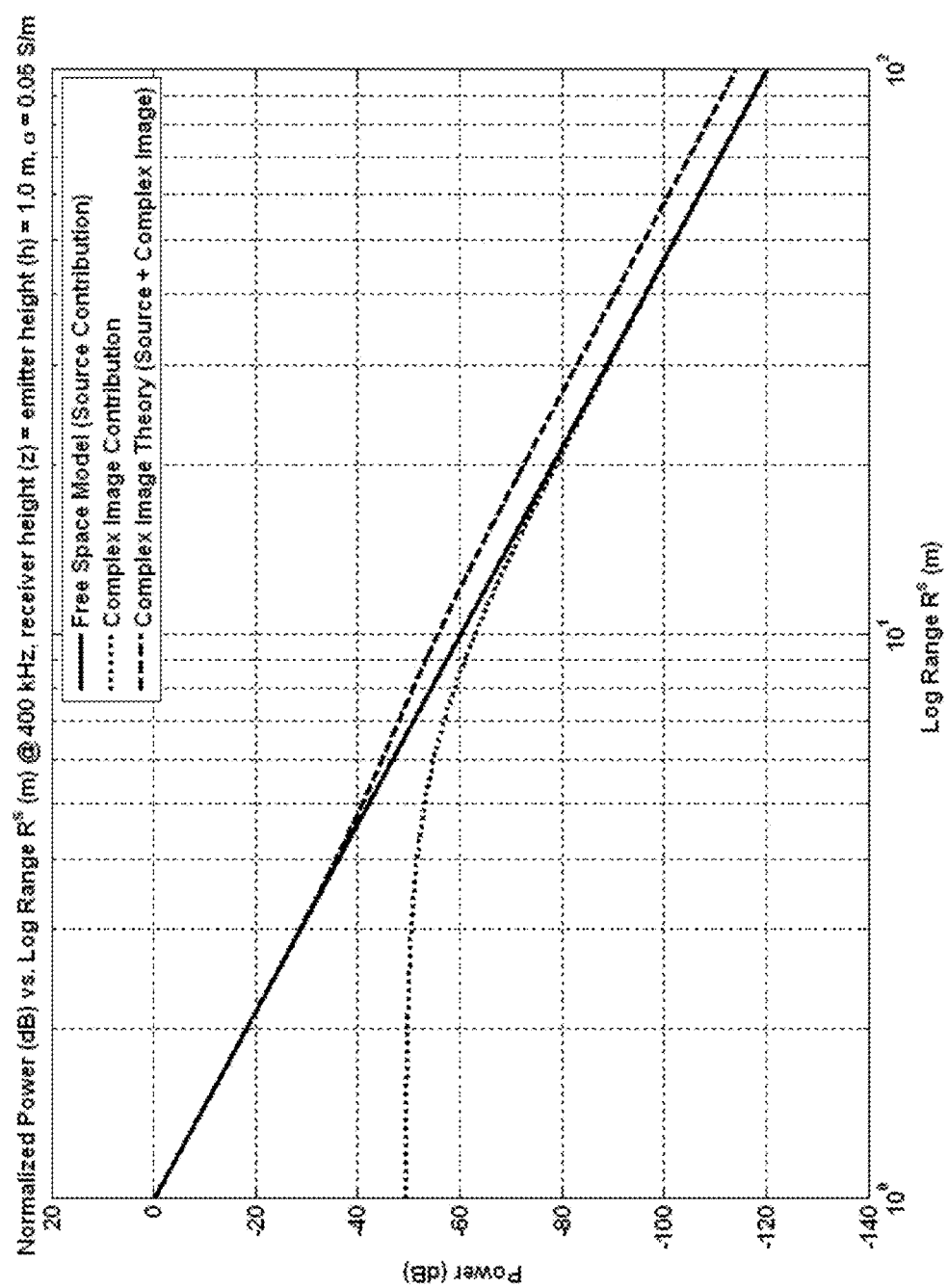
FIG. 2B illustrates power contributions from the source and complex image as well as their sum (complex image theory) versus distance at 400 kHz according to an embodiment of the invention.
Figure 2C:
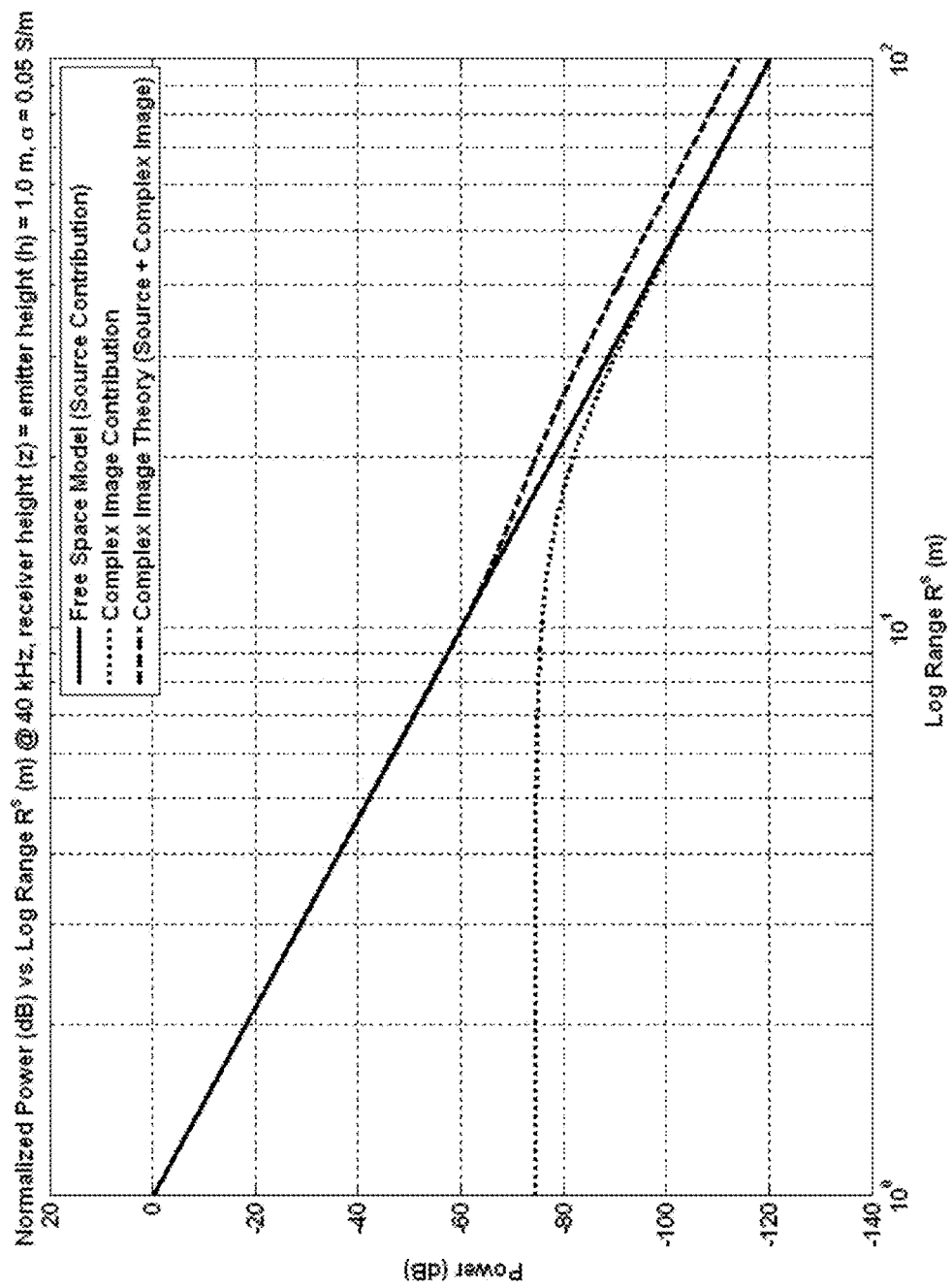
FIG. 2C illustrates power contributions from the source and complex image as well as their sum (complex image theory) versus distance at 40 kHz according to an embodiment of the invention.
Figure 2D:
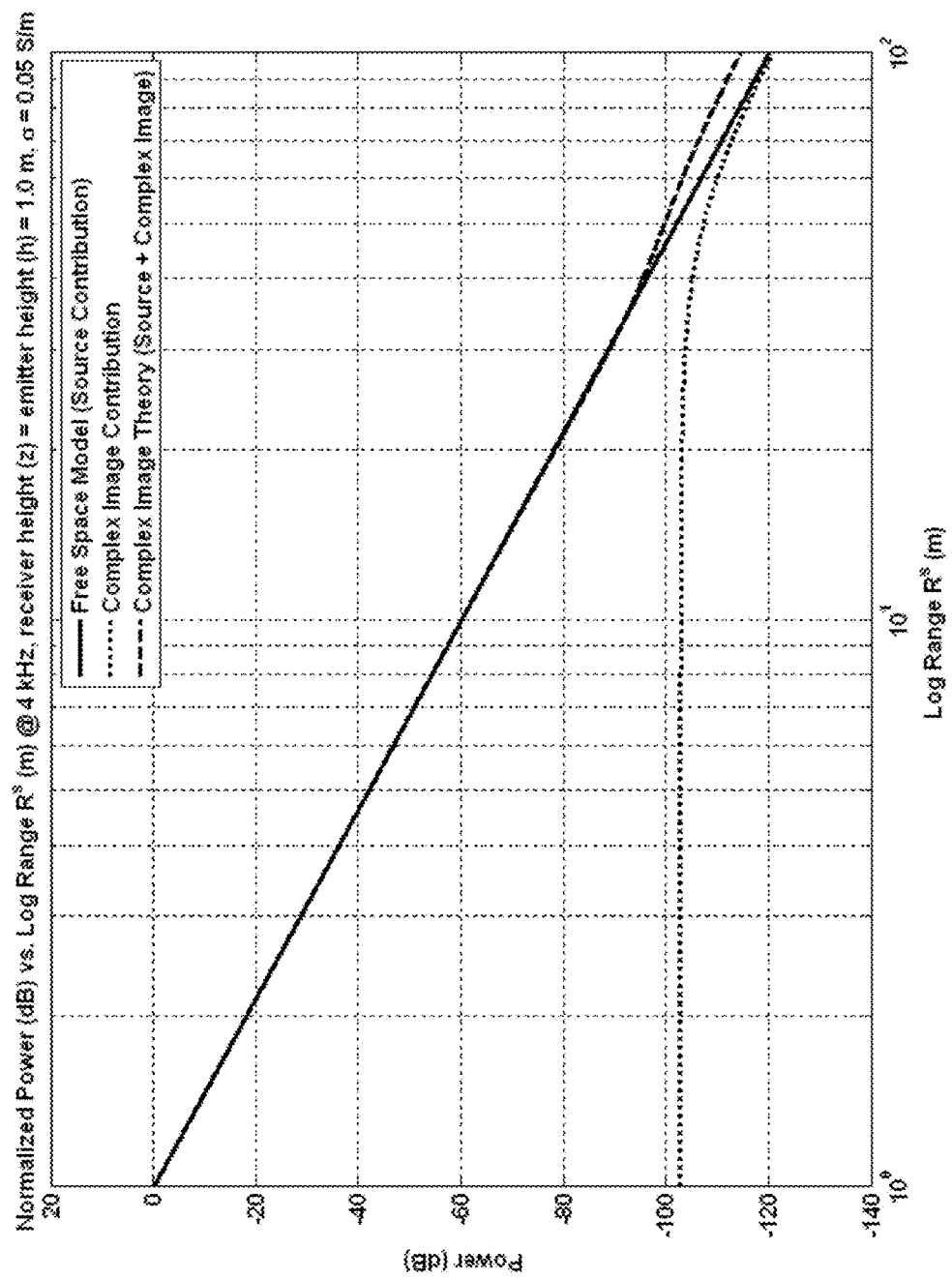
FIG. 2D illustrates power contributions from the source and complex image as well as their sum (complex image theory) versus distance at 4 kHz according to an embodiment of the invention.
Figure 2E:
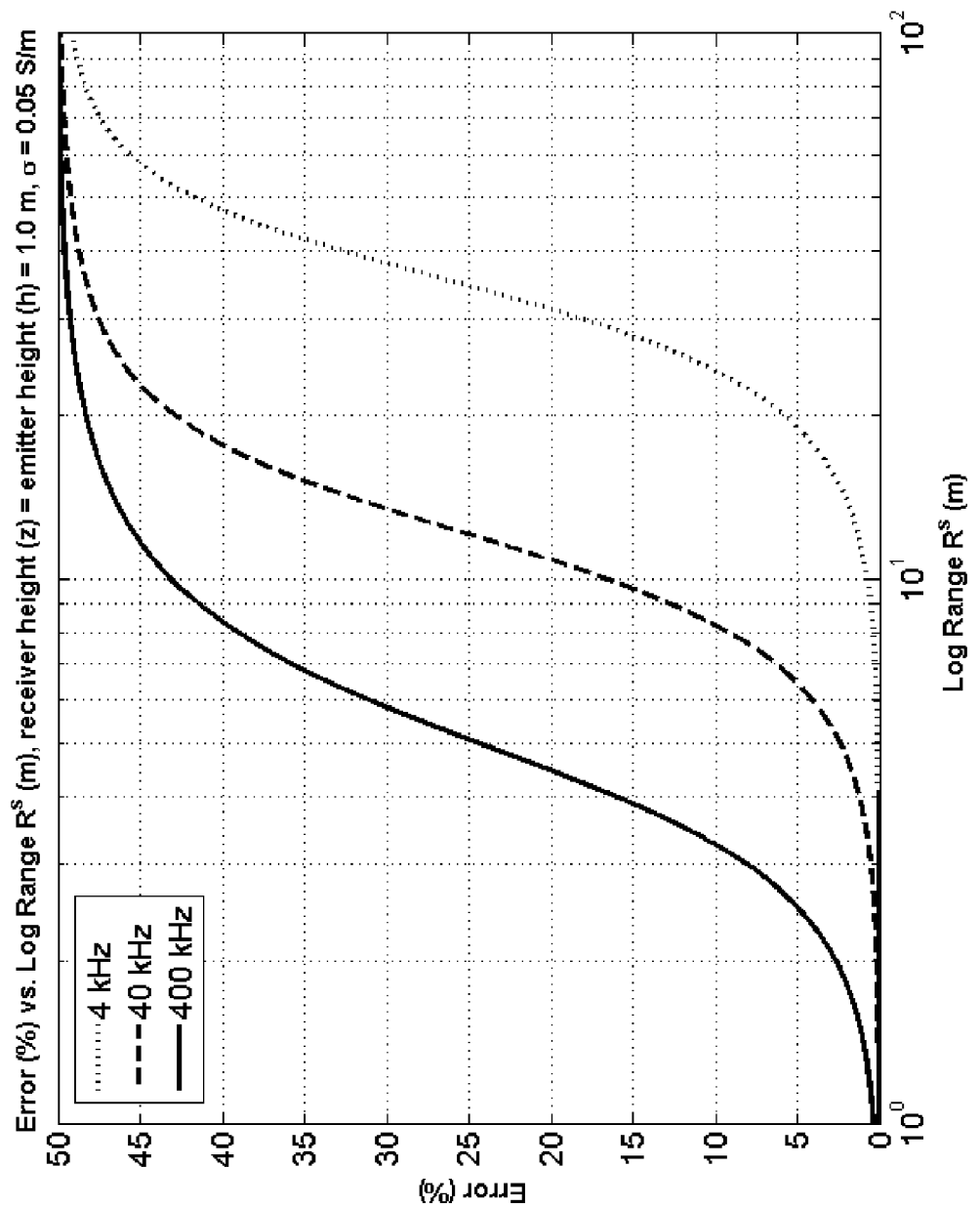
FIG. 2E illustrates the error from using the free space formulation instead of complex image theory as a function of separation distance for transmissions at 4, 40, and 400 kHz according to an embodiment of the invention.

A third generalization is to take into account the presence of the earth. This can be done approximately using complex image theory (CIT), as illustrated in FIG. 2A. In this case, the total field at the observation point is the field from the actual magnetic dipole plus that from an image dipole located at a complex distance below the ground $$\tilde{d} = h + \alpha \quad (1.10)$$

where $$\alpha = \delta(1-j), \delta \sqrt{\frac{2}{\omega \mu_o \sigma}}$$

is the "skin depth" for the ground with conductivity $\sigma$, $\omega$ is the angular frequency, $\mu_0$ is the permeability of free space, and $j=\sqrt{-1}$. The accuracy can be improved by including higher order corrections to the complex image theory, or by numerically solving the exact integral equation solution. In some cases, the playing field may be graded to facilitate water drainage. In this event, the curvature of the ground surface can also be taken into account to further improve the accuracy of the field computation.

A fourth generalization is to use the fingerprinting localization method when perturbations in the emitter's oscillating magnetic field may reduce the accuracy achieved with complex image theory. When the distance from emitter to receiver is large compared to their heights, complex image theory must be used to calculate the coupling with reasonable accuracy. The use of complex image theory in this way is a key contribution of this invention. However, it is possible that in some cases, objects or non-idealizations in the environment may render the accuracy of CIT insufficient for satisfactory localization (e.g., indoor use). In such cases, the fingerprinting localization method may be used. In this method, a calibration step is performed in which the signals received by all of the sensing antennas for systematically-chosen locations and orientations in the test space, e.g., along a rectangular grid, are measured and recorded. During operation, the signal vector corresponding to an actual position and orientation is compared statistically against the tabulated measurements to determine the most likely location and orientation.

A fifth generalization is to use magnetic materials to increase inductance and magnetic moment of the antennas without increasing their physical size. As described up to this point, the coils used both for transmitting and receiving are effectively air-core coils, as no magnetic materials are used. However, it is well-known that using a magnetic material as the core of a coil can increase its inductance and magnetic moment by a factor equal to the relative permeability of the material. In contrast to flat air-core coils, the preferred shape when magnetic materials are used is a coil wrapped along a rod of magnetic material. Using a core shape with high aspect ratio minimizes demagnetizing effects and gives the largest boost in performance. (If one is only interested in inductance, then a toroidal shape is preferred, as it provides a closed, low-reluctance path for the magnetic flux. However, the present localization technique depends on coupling of flux between the emitter and receiver, so the confined flux path provided by the toroid is undesirable.) Thus on the emitter, a magnetic core could be used to reduce the coil size, increase its moment, or both. Similarly, on the receiver, a magnetic core could be used to reduce the coil size, increase the receive sensitivity, or both. The use of a magnetic core also introduces losses, so it is important to use materials that are low loss at the frequency of operation. Ferrites are commonly used for purposes such as this, and low-loss materials are available with relative permeabilities of a few hundred to a few thousand at frequencies below 1 MHz.

Finally, a more accurate expression can be used for the magnetic dipole field. Instead of the field from an infinitesimal, static magnetic dipole (1.2), the actual field from a quasistatic, infinitesimal magnetic dipole can be used, or the exact field from a finite loop antenna.

In this regard, FIG. 2A illustrates one-dimensional complex image theory for an electrically small loop antenna emitting a periodic signal above the earth with finite conductivity according to an embodiment of the invention. The loop antenna is parallel to the yz-plane at a height h above the ground with conductivity, $\sigma$. Fields from the loop antenna induce currents in the ground that contribute to the total fields in Region I as would an emitting loop located at a depth $\tilde{d}=h+\alpha$ beneath the ground. This virtual loop is known as the complex image and the approximate fields at the point (x,y,z) in Region I can be written $$H_{\parallel}(y,z) = H_{\parallel}^{s}(y,z-h) + H_{\parallel}^{i}(y,-z-h-\alpha) \quad (1.11)$$

$$H_{\perp}(y,z) = H_{\perp}^{s}(y,z-h) - H_{\perp}^{i}(y,-z-h-\alpha) \quad (1.12)$$

where $H_{\parallel}^{s}(y,z)$ and $H_{\parallel}^{i}(y,z)$ are the magnetic field components parallel to the yz-plane from the source and image, respectively, at the observation point (y,z). Likewise, $H_{\perp}^{s}(y,z)$ and $H_{\perp}^{i}(y,z)$ are the magnetic field components perpendicular to the yz-plane from the source and image, respectively, at the observation point (y,z). The parallel and perpendicular components of $H^s(y,z)$ and $H^i(y,z)$ can be calculated from (1.2) using the coordinate system in FIG. 2.A. The distance from the emitting loop to the point of observation is $R^s$, the distance from the complex image to the point of observation is $R^i$, and the distance from the classical image of the emitting antenna (that is, the image that would occur if $\sigma=\infty$) to the point of observation is $R^o$. If greater accuracy is required near the emitting loop (that is, approximately the $0.5\delta \leq R^o \leq 4\delta$ region), additional correction terms can be added. The complete set of equations including the correction terms is then $$H_{\parallel}(y,z) = H_{\parallel}^{s}(y,z-h) + H_{\parallel}^{i}(y,-z-h-\alpha) + \left[\sum_{n=3}^{N=\infty} a_n \left(\frac{\alpha}{2}\right)^n \frac{\partial^n}{\partial \zeta^n} H_{\parallel}^{i}(y,\zeta)\right]_{\zeta=-z-h-\alpha} \quad (1.13)$$

$$H_{\perp}(y,z) = H_{\perp}^{s}(y,z-h) - H_{\perp}^{i}(y,-z-h-\alpha) - \left[\sum_{n=3}^{N=\infty} a_n \left(\frac{\alpha}{2}\right)^n \frac{\partial^n}{\partial \zeta^n} H_{\perp}^{i}(y,\zeta)\right]_{\zeta=-z-h-\alpha} \quad (1.14)$$

where the summation terms are the correction terms, $a_n$ is the $n^{th}$ coefficient of a McClaurin series ($a_n = [1/3, 0, -3/20, 1/18, 5/56, -1/20, \ldots]$ for $n \geq 3$, (See J. T. Weaver, *Image Theory for an Arbitrary Quasi-static Field in the Presence of a Conducting*

*Half Space*, Radio Science, vol. 6, num. 6, pp. 647-653, 1971, incorporated by reference here), and $\alpha=\delta(1-j)$. When $R^o \gg \delta$, the correction terms have little effect.

In FIG. 2A, the source loop antenna, complex image, and point of observation are all located on the yz-plane; however, in general, the source and observation loop antennas can have any arbitrary position and orientation.

FIG. 2(B-D) illustrates the power vs. distance effect for the source contribution, the image contribution, and the complex image theory according to an embodiment of the invention. As shown, the image contribution generally is reduced as the frequency (of the emitter) is reduced. Thus, 4 kHz reduces the image contribution compared to 40 kHz, which reduces the image contribution compared to 400 kHz (FIG. 2B-D). Thus, the error (as a function of distance) from using the free space formulation instead of complex image theory is reduced for a 4 kHz emitter when compared to 40 and 400 kHz, as illustrated in FIG. 2E. In FIG. 2E, the error is defined as Error=$|(1-H_{fs}/H_{ci})|*100$ where $H_{fs}$ is the complex magnetic field calculated assuming free space conditions, $H_{ci}$ is the complex magnetic field calculated using complex image theory, and the orientation of the emitting loop is as shown in FIG. 2A.

In order to account for the image contribution at higher frequencies, embodiments of the invention utilize complex image theory. There is an associated error term when the complex image theory is not used, and this error term becomes increasingly negligible at short distances and as the frequency is reduced, as illustrated. In general, the error from not using complex image theory is typically greater than 10% further than a skin depth away from the classical image ($R^o > \delta$), and rapidly increases to 50%. Here, the error is defined as Error=$|(1-H_{fs}/H_{ci})|*100$ where $H_{fs}$ is the complex magnetic field calculated assuming free space conditions, $H_{ci}$ is the complex magnetic field calculated using complex image theory, and the orientation of the emitting loop is as shown in FIG. 2A. Thus, complex image theory is utilized by embodiments of the invention to extend the distance (beyond a few meters) at which accurate measurements can be had and in order to tolerate higher frequencies needed to produce appropriate signals at large distances.

Thus, it cannot be simply concluded that the lowest possible frequency is preferable, as discussed herein, because reducing the image contribution with lower frequencies will not result in an optimal system. Rather, the frequency needs to be balanced to achieve an appropriate signal strength (which increases with frequency). The balance needs to take into account the image contribution and the need to realize a quasistatic magnetic field, which suggest a lower frequency/larger wavelength, while also taking into account the competing consideration of a need for increased signal strength, which suggests the need to use a higher frequency. Higher frequencies lead to increased signal strength essentially because a voltage is induced in the coil using Faraday's Law, which dictates that the faster the change in the magnetic field, the higher the voltage induced in the coil. Accordingly, the lower the frequency, the more difficult it is to detect the signal from the emitter. Thus, the frequency chosen must be high enough to provide appropriate signal strength, subject to the distance (with respect to wavelength) of the implementation. An estimate of the maximum frequency is related to the maximum distance by $f_{max} \leq c/(8 d_{max})$ where $f_{max}$ is the maximum frequency, c is the speed of light in a vaccum, and $d_{max}$ is the maximum distance. Accordingly, an embodiment of the invention implements an emitter that emits in a frequency range of 100 kHz to 500 kHz.

Another technique well known to one skilled in the art is called "classical image theory" or "image theory". In this technique, the earth is assumed to have infinite conductivity which creates an image located at a distance h below the ground when the source is located at z=h, as shown in FIG. 2A. The error associated with this technique approaches 100% close to the source, and reduces to less than 10% further than five skin depths away ($R^o > 5\delta$) from the classical image. Here, the error is defined as Error=$|(1-H_i/H_{ci})|*100$ where $H_i$ is the complex magnetic field calculated using classical image theory, $H_{ci}$ is the complex magnetic field using complex image theory, and the orientation of the emitting loop is as shown in FIG. 2A. Therefore, complex image theory is superior to both classical image theory and using only the free-space equations for position location.

Multiple antennas can be used with the emitter to increase the accuracy of the system. The strength of the measureable magnetic field at each receiver's antenna depends on the relative orientation between the emitter's antenna and the receiver (as formulated in 1.6-1.8). Hence, for the example described in FIG. 2A, since the coupling between the emitter's antenna and each receiver's fixed antenna is a function of the relative azimuthal orientation, the error defined in 1.9 varies with the emitter's orientation. Specifically, the error increases when the dipole field of the emitter is at null with any of the receivers.

In an embodiment of this invention, the emitter includes multiple collocated antennas, each positioned in a different orientation. For example, N antennas may be configured in an azimuthal separation of 180/N degrees. Such a configuration results in different levels of coupling between each antenna in the emitter and receiver. These levels of coupling continuously vary as the emitter (attached to a moving object) changes its relative orientation. For example, in one embodiment, two orthogonal loops may be embedded into an object (e.g. a football) so that in times when one loop is weakly coupled due to a null dipole field, the other loop will provide a stronger coupling.

According to an embodiment of this invention, each antenna in an array of receivers' antennas provides a unique equation. A subset of equations out of the total number of unique equations may correspond to antennas for which strong couplings exist. The voltage measured at these strongly coupled antennas will be relatively high. Hence, this subset of equations may be selected to solve for the unknown emitter's position and orientation by, for instance, evaluating the magnitude of the measured voltage. This removal of equations corresponding to weakly coupled fields provides a reduced set of equations that represents strong coupling, thereby improving the system signal-to-noise ratio (SNR).

To identify the emitter antenna for which a strong emitter-to-receiver coupling exists, the magnetic coupling from each emitter antenna must be separable. The coupling from each emitter antenna can be identified by driving each antenna oscillation with a different frequency (i.e., frequency multiplexing), driving each antenna one at a time sequentially (i.e., time multiplexing), or by modulating the current driving each antenna with a unique waveform such as with a set of orthogonal waveforms (i.e., code multiplexing).

In yet another embodiment, multiple emitters may be attached to different locations on an articulated object (e.g. a human body). In such a configuration, measuring the position and orientation of each emitter may be used to derive the pose and motion of the articulated object. Attaching one or more emitters to multiple objects, then, may provide measurements allowing recognition of spatial interaction among objects through time.

Experimental verification of an example embodiment of the invention is now described. A capability of embodiments of the invention is the accurate measurement of the magnetic field from a magnetic dipole over the distance necessary for the particular application. For the case of a football field, the maximum range would be somewhat longer than the width of the field, or on the order of 1 to 57 yards or greater.

Figure 3:
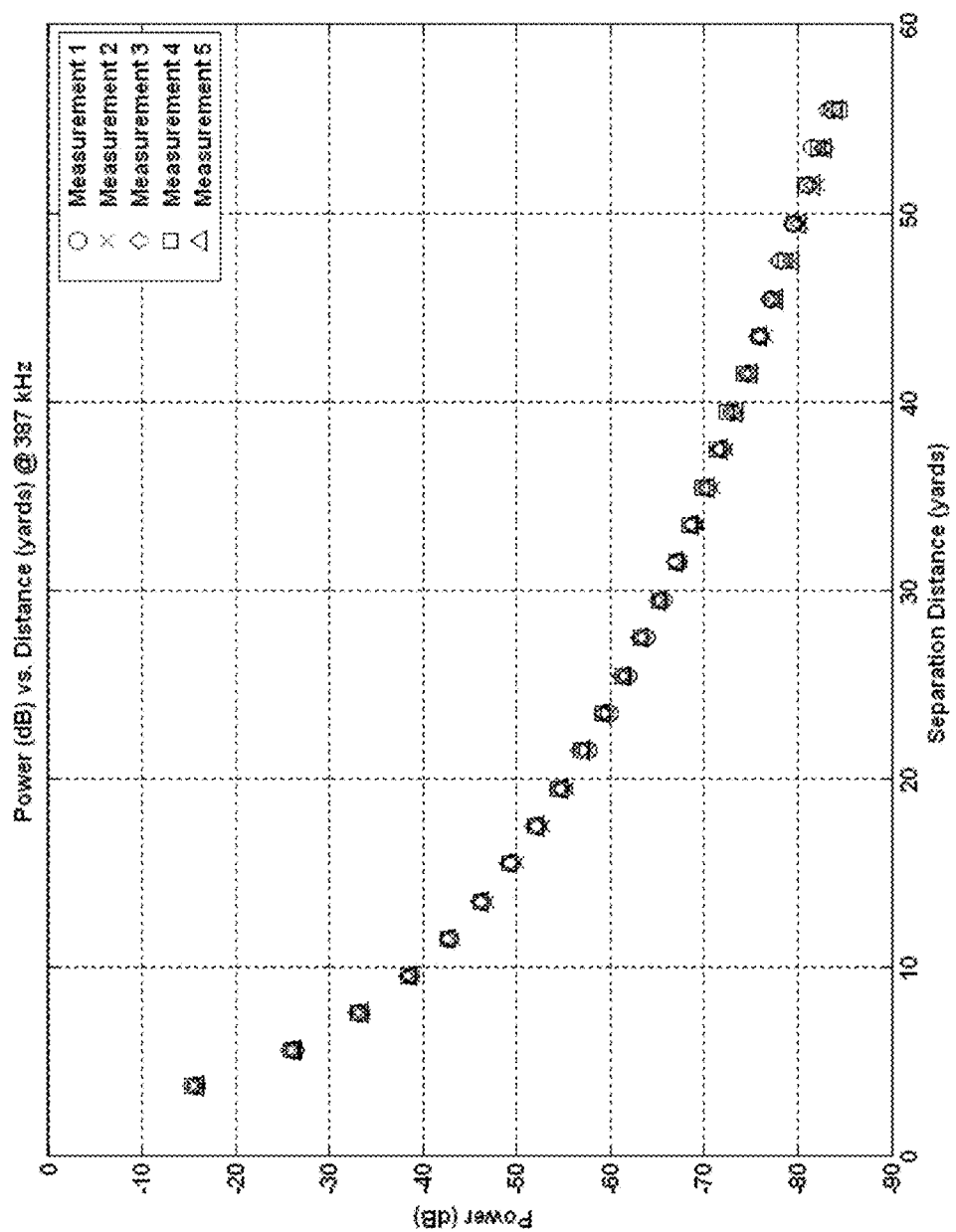
FIG. 3 illustrates measurements of the signal received from an electrically small loop antenna above the earth versus distance according to an embodiment of the invention.

FIG. 3 shows the result of a set of 5 measurements at different locations on a soccer field, showing accurate and repeatable measurements (measurements 1-5 overlap as illustrated) out to about 57 yards. The magnetic dipole consisted of a football with a coil of wire wrapped around it and driven with a signal generator at 387 kHz.

Figure 4:
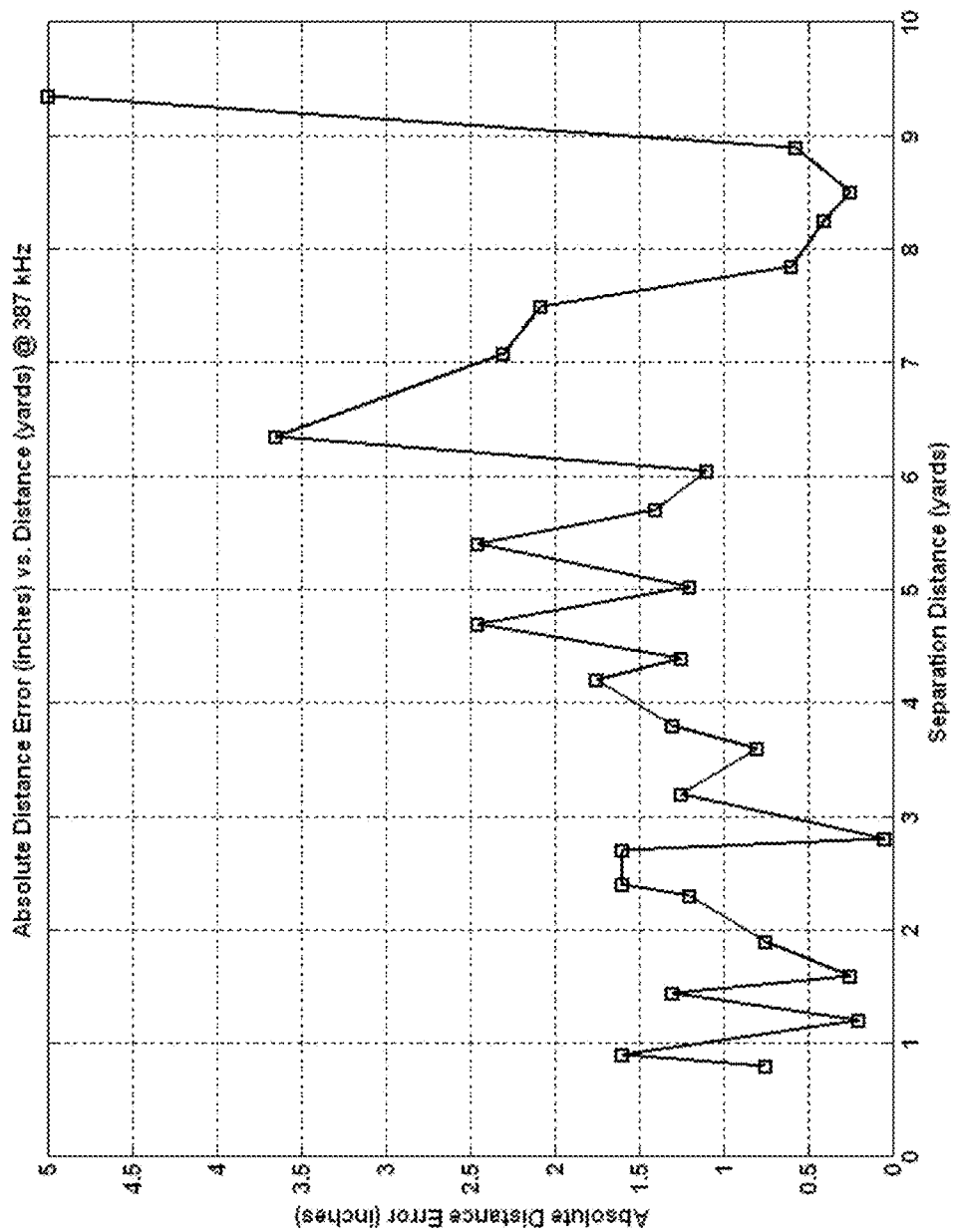
FIG. 4 illustrates the one-dimensional (height and orientation of the emitter fixed) measurement error as a function of the separation distance between the emitter and receiver according to an embodiment of the invention.

The complex image theory model was used to infer in real time the distance based on the measured magnetic field strength out to about 9 yards. As shown in FIG. 4, the average accuracy over this distance is on the order of 1-2 inches or less. This exemplary measurement was taken at 9 yards because of the test setup; however, the only fundamental limit to the measurement distance is the signal-to-noise ratio at the receiver. Moreover, several measurements have been conducted using other test conditions with measurement distances up to 51 yards. The accuracy of these measurements decreased with the signal-to-noise ratio. In these cases, post-processing was conducted to solve for location.

Figure 5:
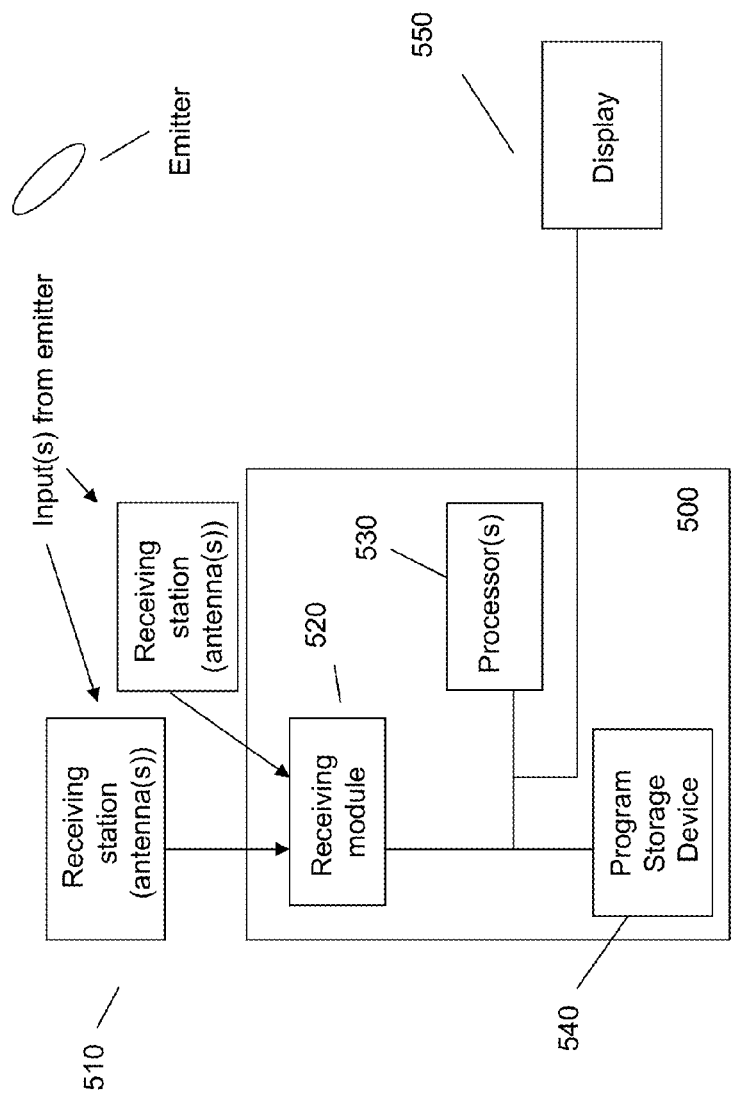
FIG. 5 illustrates an example system for position tracking according to an embodiment of the invention.
Figure 8:
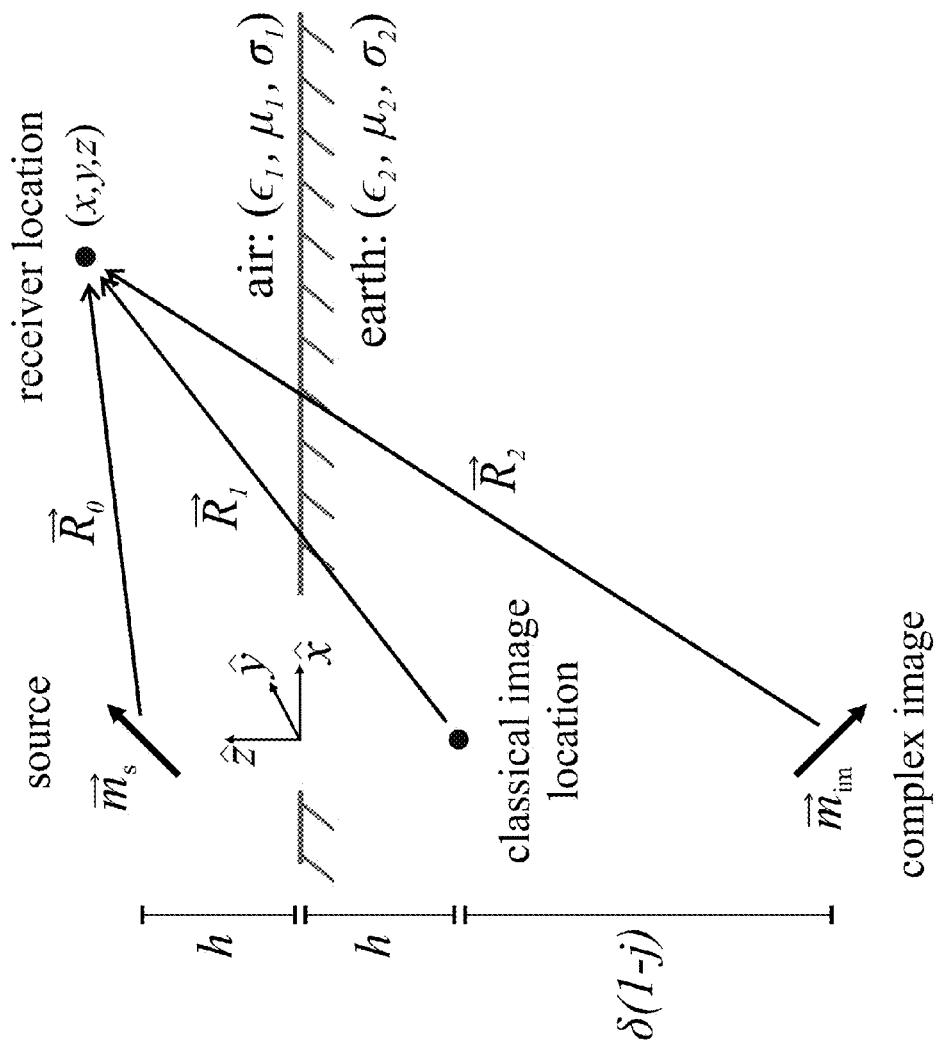
FIG. 8 illustrates geometry for a transmitting loop of current (emitter) about a semi-infinite earth according to an embodiment of the invention.

FIG. 5 illustrates a high-level view of a system for position tracking according to an embodiment of the invention. As shown, the emitter provides inputs to one or more receiving stations 510. As discussed herein, the receiving station(s) 510 may be for example orthogonal antenna loops. The receiving station(s) 510 in turn provide the inputs to a computer system 500, such as the computer system described in connection with FIG. 8, via a receiver module 520. The computer system contains necessary hardware elements such as one or more processors 530 and a program storage device 540 having computer readable program code embodied therewith to perform the position tracking functionality outlined above. Notably, embodiments of the invention provide real-time tracking capabilities, such that the position of the emitter (and the object to which it is attached) can be tracked and viewed on a display 550 in real-time.

Figure 6:
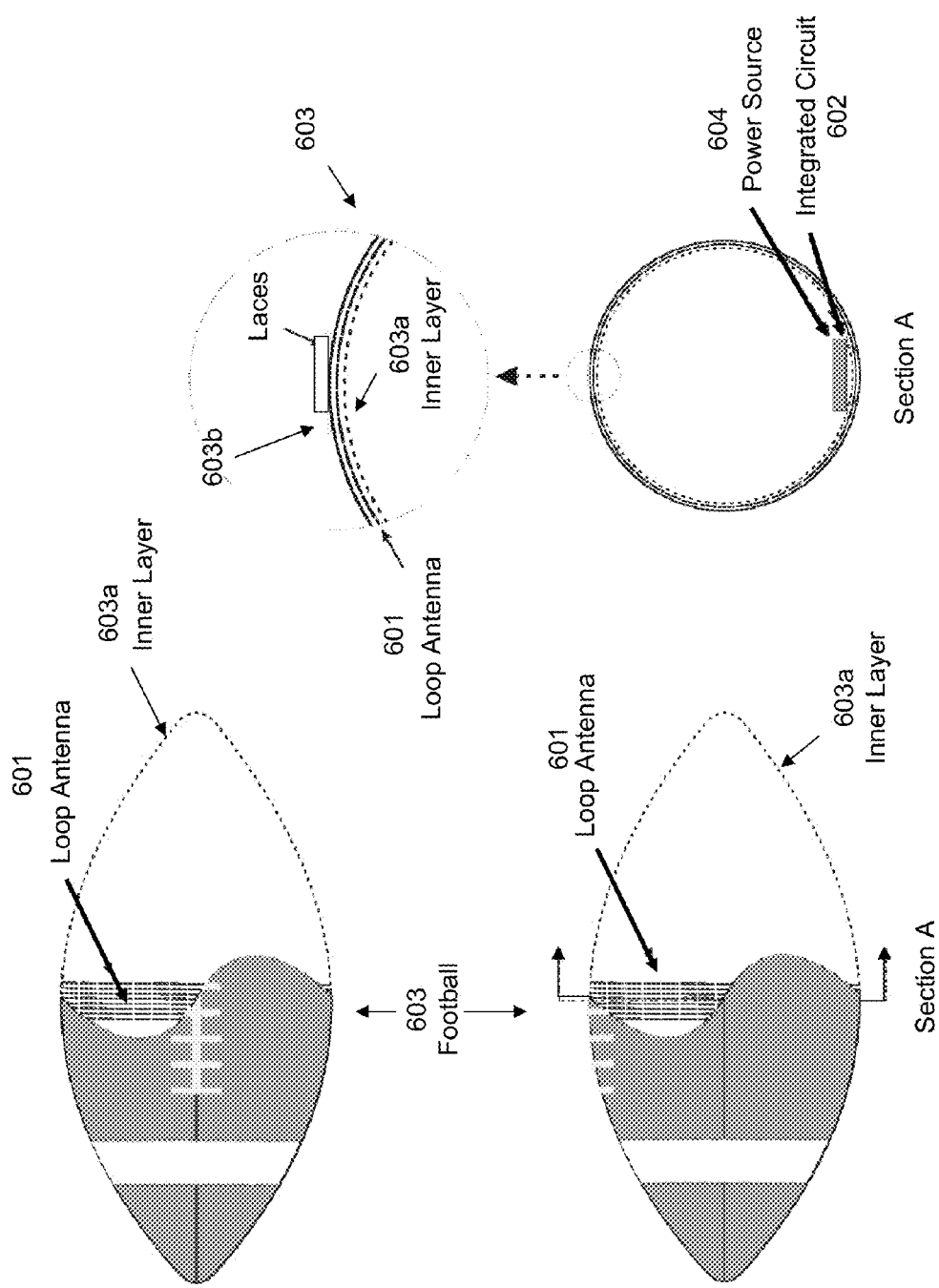
FIG. 6 illustrates an example emitter composed of an embedded, multi-turn loop and circuit for the specific purpose of tracking an American football during a game according to an embodiment of the invention.
Figure 7:
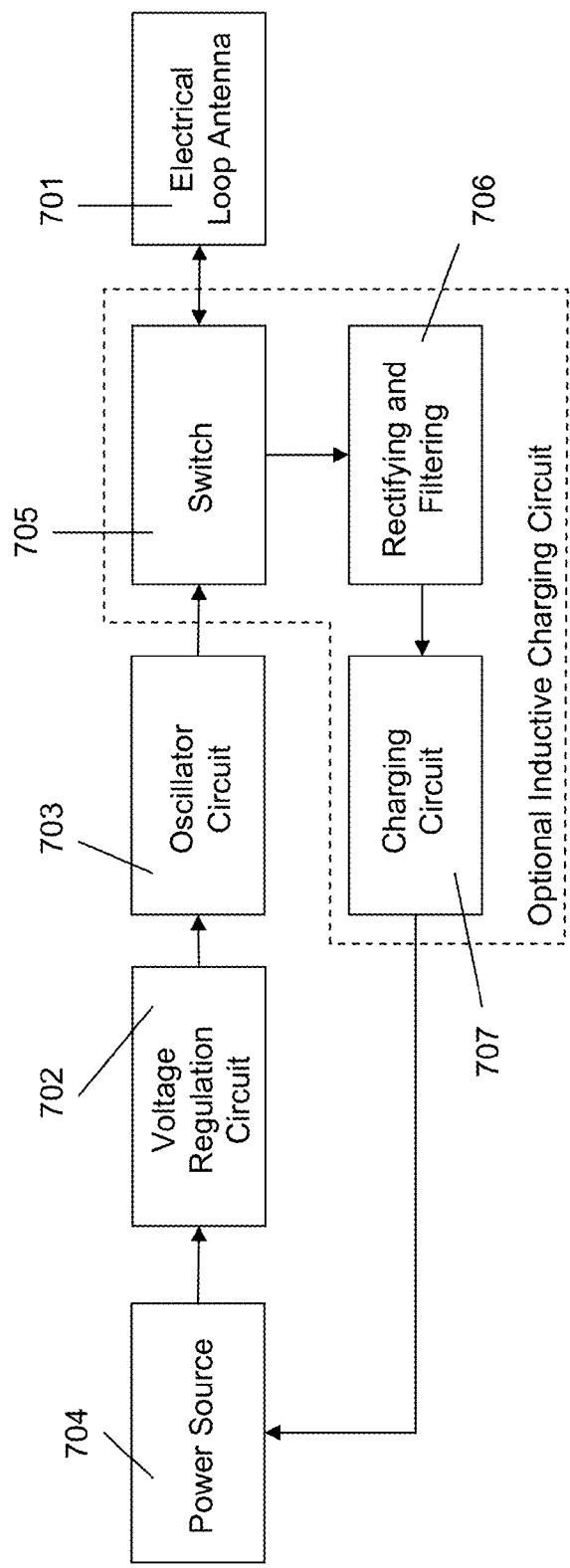
FIG. 7 illustrates the block diagram of an example emitter according to an embodiment of the invention.

The emitter described in connection with FIG. 5 can for example consist of a multi-turn loop antenna 601 and an integrated circuit 602, as illustrated in FIG. 6. For an American football tracking application, both the multi-turn loop 601 and the circuit 602 can be embedded within the football 603. The multi-turn loop 601 can be wound around the inner lining 603*a* (or layer) of the football 603, as depicted in FIG. 6. The circuit 602 can contain for example a power source 604 and other integrated circuits (not shown), as depicted in FIG. 7, which can be used to counter-balance the air-valve or the laces, et cetera, of the football 603. The outer layer/skin 603*b* (for example, leather) can completely shield the emitter (multi-turn loop 601 and circuit 602) from sight, touch, access, et cetera.

As illustrated in FIG. 7, example components of an emitter include a power source 704, voltage regulation circuit 702, oscillator circuit 703, and an electrical multi-turn loop antenna 701. Moreover, optional inductive charging techniques will allow the power source to be charged using inductive coupling through the multi-turn loop 701. In order to accomplish this wireless-inductive charging, additional components such as a rectifying and filtering circuit 706, as well as a charging circuit 707 and switch 705 may be required.

Accordingly, embodiments of the invention provide a system for using low frequency, quasistatic magnetic fields for position location and tracking of athletes and/or objects/items used by athletes during play. Some advantages of a system according to embodiments of the invention include but are not necessarily limited to immunity to multi-path effects; the tracking is not affected by the presence of people and loss of the LOS; minimum complexity on the item/person to be tracked; and greater range than conventional approaches, such as passive or semi-passive (that is, battery assisted) RFID or UWB approaches.

The basic feasibility of an embodiment of the invention has been demonstrated by measuring the strength of the magnetic field induced by a loop antenna mounted on an American football as a function of distance. The signal was accurately measured at distances of greater than 55 yards, and was not affected by the presence of people or a person wrapping arms around the football.

In other embodiments, systems, methods and products use complex image theory (CIT) for position estimation in which the estimation error is reduced using multiple frequencies. The inventors have recognized that the estimation error of CIT is position and frequency dependent, with error varying at a fixed location as frequency is changed, and the error varying at a fixed frequency as the distance is changed.

By leveraging the variation of error with frequency, an embodiment provides a multi-frequency positioning system that may combine the fields to obtain a lower overall estimation error than a single-frequency system. Simulated reduction of position-estimation errors over a two-dimensional space are shown herein by way of example, and were produced by averaging the position estimations from two different frequencies. The two-dimensional space simulations of error reduction are examples only and those having ordinary skill in the art will recognize that the principles taught herein may be extended beyond the two-dimensional space examples.

A basic principle underlying embodiments is use of complex image theory (CIT) for emitter location determination, as described throughout. For simplicity, the description hereinafter is restricted to location and orientation within an x-y plane. The quantities to be determined are image coordinates of the emitter, e.g., as placed within a ball, with respect to the image axis. As further described herein, a minimum of three independent measurements are needed to determine these quantities. Using orthogonal loop antennas, each pair of loops gives measurements of two orthogonal field components, for a total of 4 independent measurements. If a single frequency loop is powered by the emitter, then two orthogonal receiving antennas would provide two independent measurements of the field induced by the emitter. If orthogonal loop antennas are used at the emitter and each loop was driven with a different frequency, then four independent measurements could be made. This is more than enough information to solve for the three unknowns. The use of additional loops or loop pairs gives further redundancy that can be used to improve the accuracy of the position and orientation measurements.

As described herein, estimation error is found to be frequency and location dependent. Accordingly, an embodiment may further improve the accuracy of the position and orientation measurements using multiple frequencies provided by a multi-frequency emitter.

Frequency Dependence of the CIT Approximation

The exact integral equation for magnetic flux density, $\vec{B}$, in the quasistatic region of a transmitting loop antenna can be split into two components. First, there is a contribution from the transmitting loop itself. Second, there is a contribution from eddy currents induced in the ground plane (i.e., earth). From the geometry of FIG. 8 (noting some notation changes with respect to FIG. 2A above), the flux density contribution from the transmitting loop is characterized by the flux density from a simple magnetic dipole:

$$\vec{B}(\vec{R}_0, \vec{m}_s) = \left(\frac{-k^3 \mu_0}{4\pi}\right) \left\{ \left[\frac{1}{(kR_0)^3} + \frac{j}{(kR_0)^2}\right](1 - 3\hat{R}_0 \hat{R}_0 \cdot)\vec{m}_s + \left(\frac{1}{(kR_0)}\right)\hat{R}_0 \times (\hat{R}_0 \times \vec{m}_s) \right\} e^{-jkR_0} \quad (1)$$

This approximation is very accurate at distances beyond ten times the transmitting loop radius. In the examples used throughout, the simulated loop radius is 8 cm, thus, the approximation of the fields from the transmitting loop alone is accurate for distances $R_0 > 80$ cm. The eddy currents induced in the ground plane are approximated in CIT simply by an image of the transmitting magnetic dipole located at a complex-valued depth $h + \delta(1 - j)$ below the surface. Here, $\delta = \sqrt{2/(\omega \mu_2 \sigma_2)}$ is the skin depth. The flux density contribution from the image uses (1) with the complex valued position vector $\vec{R}_2$ and magnetic moment $\vec{m}_{im}$ substituted in place of $\vec{R}_0$ and $\vec{m}_s$, respectively.

Figure 9:
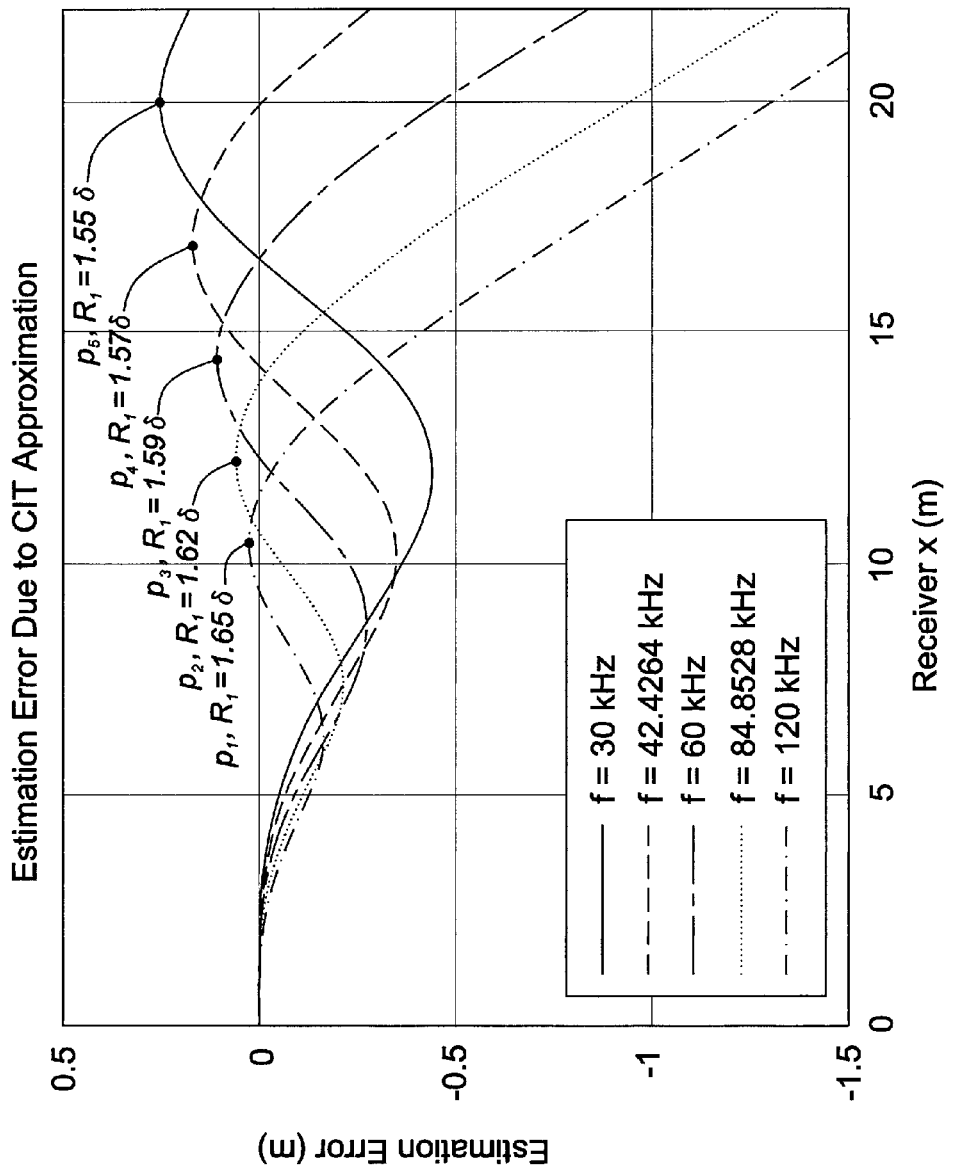
FIG. 9 illustrates estimation error of complex image theory determined emitter position location at various frequencies according to an embodiment of the invention.

The image dipole is the main source of error in the CIT approximation and exhibits frequency dependence. As an illustrative example, FIG. 9 shows the estimation error up to a distance of 22 m for frequencies spaced by a factor of $\sqrt{2}$. The estimator uses CIT to get the x-coordinate of the position assuming y, z, and orientation are known a-priori. The input to the estimator is the magnetic flux density produced by the exact integral formulation. No noise was introduced; therefore, the only significant source of error is the difference in flux density predicted by CIT over the exact integral.

FIG. 9 shows that the error curve shifts to the left as frequency increases and the initial oscillatory portion reduces in magnitude. Note that the error at larger distances increases with increased frequency. Thus, as frequency increases, the error at short distances becomes smaller, but the error at longer distances becomes larger. Horizontally, the error curve moves left and reduces in amplitude at short distances by approximately by a factor of two when the frequency is quadrupled. Others have previously explained this observation in detail, where it was found that the locations of highest approximation error occur at approximately the same $R_1$-distance expressed in skin depths. For example, FIG. 9 shows that the locations of maximum estimation error $(p_1, \ldots p_5)$ are located at $R_1 \approx 1.6\delta$ with a small offset depending on the frequency. Thus, the error curves compress horizontally approximately proportional to $1/\sqrt{f}$ since $\delta \propto 1/\sqrt{f}$.

The estimation error can be improved by using the higher-frequency fields at short distances and the lower-frequency fields at longer distances. If the location is not known, a simple algorithm may be used. In an embodiment, the averaging of the multi-frequency fields to reduce the errors across all locations was implemented as an illustrative example. Frequencies that are separated by a factor of 2 may provide the best complementing error curves. The frequencies of 30 kHz and 60 kHz are chosen herein for the example two-dimensional simulation described in connection with FIG. 9. It will be appreciated that the benefits of error reduction in the example case extend to other cases (e.g., three dimensional cases).

Two-Dimensional Reduction of Estimation Errors

To illustrate an example of an error reduction technique provided by an embodiment using multiple frequencies, a simulation was provided for the x-coordinate estimation errors in a two-dimensional space above a semi-infinite ground plane at 30 kHz and 60 kHz. A transmitting loop antenna was located in air ($\epsilon_0$, $\mu_0$, 0 S/m) 1 m above the earth ($\epsilon_0$, $\mu_0$, 0.05 S/m) at the location (0, 0, 1) m and oriented such that its magnetic dipole moment is pointed in the z-direction. The receiver measures the z-component of the magnetic flux density $B_z$ in the x-y plane located 1.5 m above the earth. The measurement was simulated by numerically evaluating the exact integral formula for the magnetic flux density $B_z$. Then, this measured value of $B_z$ is input into the CIT estimator, which produces an estimate for the x-coordinate by inverting the CIT algebraic equations. The position coordinates y and z and also the orientation of the transmitter are known to the estimator a-priori. The estimation error is the difference $\hat{x} - x$ between the estimated value $\hat{x}$ and the true value x. Positive error means the estimator is producing values "too far" while negative values are "too close".

Figure 10A:
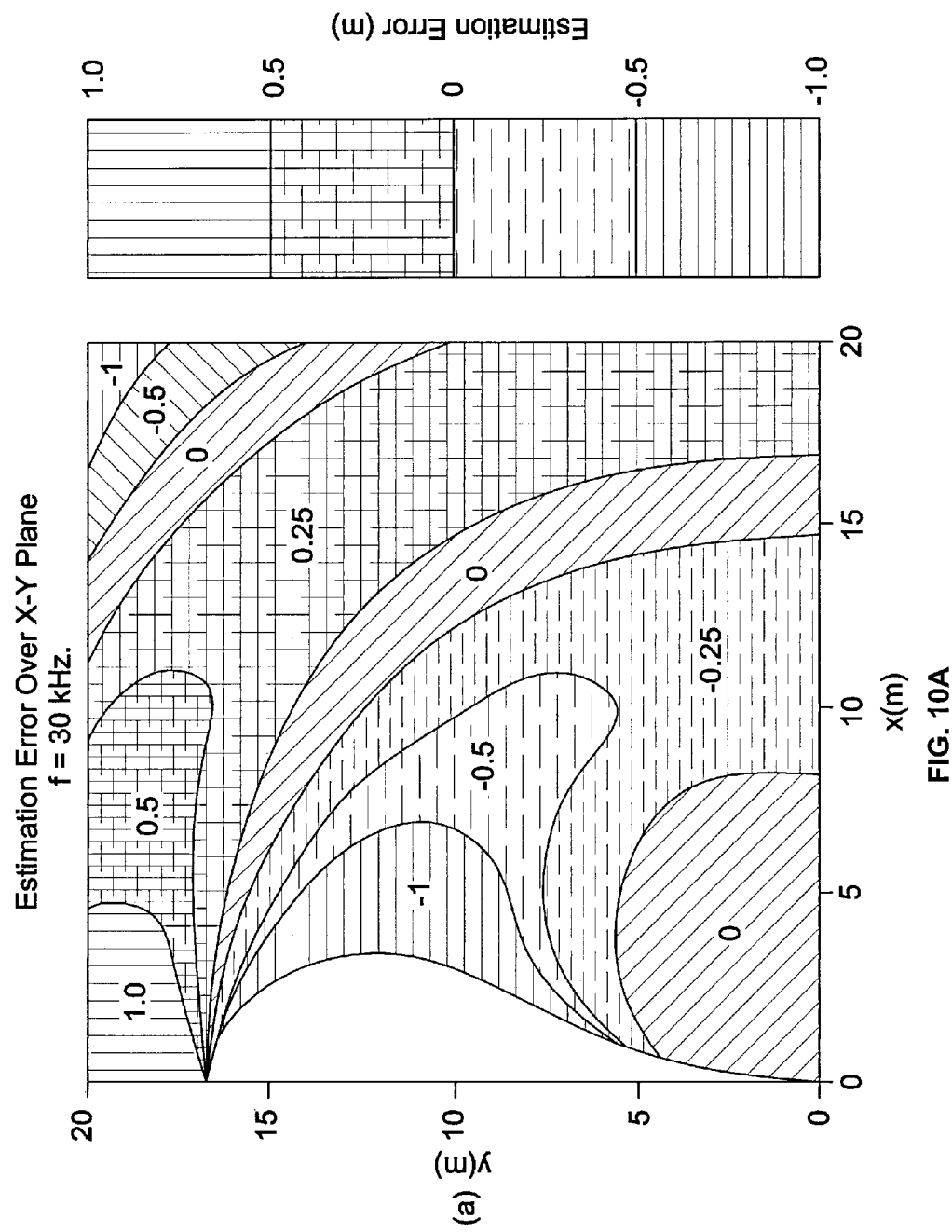
FIG. 10(A-B) illustrates estimation error in the x-y plane for different frequencies according to an embodiment of the invention.
Figure 10B:
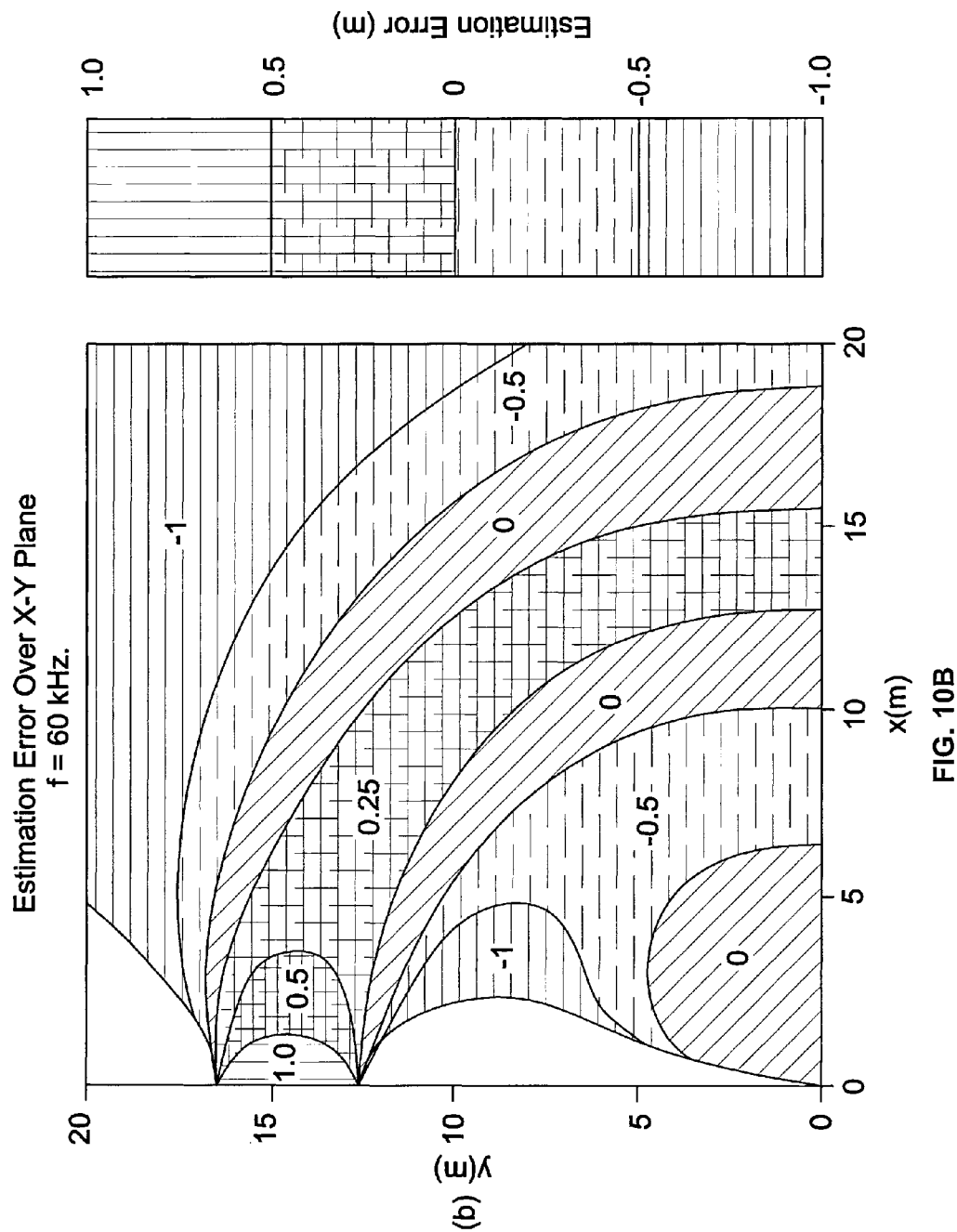

FIG. 10(A-B) shows the frequency dependence of estimation errors of x using the frequencies 30 kHz and 60 kHz individually. For the 30 kHz case, the large band of positive error is located approximately between 18.5 m and 23 m from the origin of the plot. This same large band of positive error is located between 12.75 m and 16.75 m from the origin of the plot for the 60 kHz case. In terms of skin depths, these bands are both located between approximately 1.4δ and 1.8δ. These bands are offset from one another, which allows averaging to work.

FIG. 11 shows that the overall estimation error reduced by averaging the two single-frequency estimations, (i.e., $\hat{x} = (\hat{x}_{30} + \hat{x}_{60})/2$). The RMS error across the entire two-dimensional plane plotted for the combined case is 48.1 cm. On the other hand, the RMS error is 55.2 cm for the 30 kHz case and 87.8 cm for the 60 kHz case, which is a reduction of 12.9% and 45.2% respectively. The technique may be applied to three dimensions. Further, improvements such as weightings and additional frequencies may improve on the results of this example simulation.

By way of illustrative example, a signal from an emitter may provide multiple frequencies to reduce error for use in a variety of applications. An emitter or emitters may provide multiple frequency output in a variety of ways and it should be noted that an embodiment is not limited to any particular methodology. For example, in an embodiment, each antenna of multiple antennas, may oscillate with a different frequency (i.e., frequency multiplexing), a single antenna may be driven sequentially, e.g., one frequency at a time (i.e., time multiplexing), etc. This provides a multi-frequency output that, as described herein, may be useful in reducing error in the estimated location.

Referring back to FIG. 5, a high-level view of a system for position tracking according to an embodiment of the invention may also be used in connection with multiple frequency error reduction. As shown, an emitter provides inputs to one or more receiving stations 510. Notably, with the addition of a multi-frequency emitter, a reduced number of receiving stations 510 may be utilized, e.g., a single receiving station 510, depending on the implementation's details and desired accuracy. As discussed herein, the receiving station(s) 510 may be for example orthogonal antenna loops. The receiving station(s) 510 in turn provide the inputs to a computer system 500, which may include a frequency detector or like mechanism, such as the computer system described in connection with FIG. 12, via a receiver module 520. The computer system contains necessary hardware elements such as one or more processors 530 and a program storage device 540 having computer readable program code embodied therewith to perform the position tracking functionality outlined above. Notably, embodiments of the invention provide real-time tracking capabilities, such that the position of the emitter (and the object to which it is attached) can be tracked and viewed on a display 550 in real-time.

The emitter described in connection with FIG. 5 can for example consist of a multi-turn loop antenna and an integrated circuit. For an American football tracking application, e.g., as illustrated in the example of FIG. 6, both the multi-turn loop and the circuit can be embedded within the football. The multi-turn loop can be wound around the inner lining of the football. The integrated circuit can contain, for example, a power source and other integrated circuits (not shown), which can be used to counter-balance element(s) inherent to the object, e.g., the air-valve or the laces, etc., of the football. The outer layer/skin (for example, leather) can completely shield the emitter (multi-turn loop and circuit) from sight, touch, access, etc.

As was illustrated in FIG. 7, example components of an emitter emitting more than one frequency may include a power source 704, voltage regulation circuit 702, oscillator circuit 703 (e.g., voltage controlled oscillator), and an electrical multi-turn loop antenna 701, with the understanding that the multi-turn loop antenna 701 may be adapted to provide multi-frequency output, as described herein. Moreover, optional inductive charging techniques will allow the power source to be charged using inductive coupling through the multi-turn loop 701. In order to accomplish this wireless-inductive charging, additional components such as a rectifying and filtering circuit 706, as well as a charging circuit 707 and switch 705 may be required.

Accordingly, embodiments of the invention provide a system for using low frequency, quasistatic magnetic fields for position location and tracking of athletes and/or objects/items used by athletes during play. Some advantages of a system according to embodiments of the invention include but are not necessarily limited to immunity to multi-path effects; the tracking is not affected by the presence of people and loss of the LOS; minimum complexity on the item/person to be tracked; greater range than conventional approaches, such as passive or semi-passive (that is, battery assisted) RFID or UWB approaches, and reduced estimation error, as provided by an embodiment.

It will be understood by those having ordinary skill in the art that certain aspects of the invention may be implemented using one or more computing devices configured appropriately to execute program instructions consistent with the functionality of the embodiments of the invention as described herein. In this regard, FIG. 12 depicts a non-limiting example of such a computing device.

Figure 12:
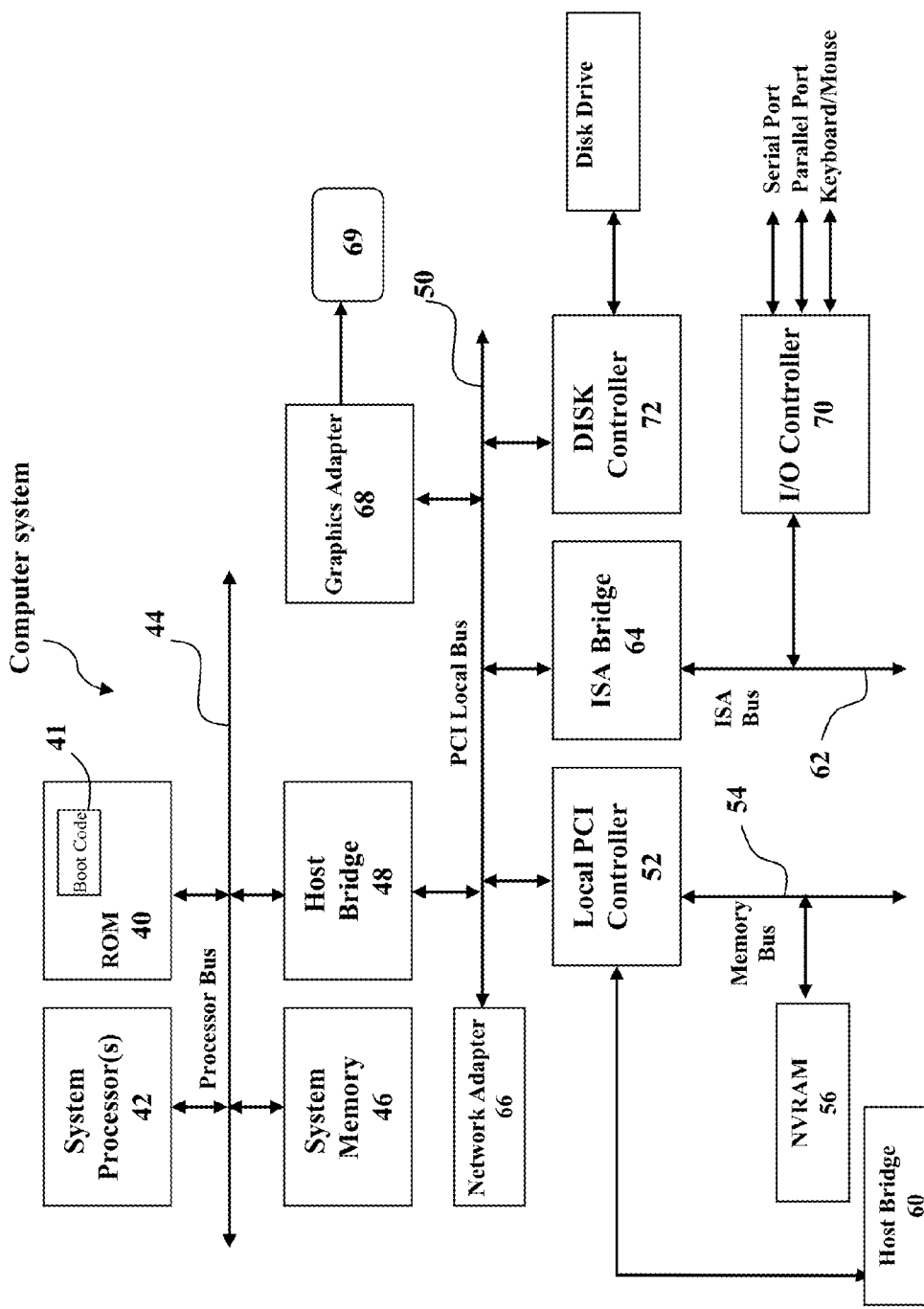
FIG. 12 illustrates an example computer system according to an embodiment of the invention.

Referring now to FIG. 12, there is depicted a block diagram of an illustrative embodiment of a computer system. The illustrative embodiment depicted in FIG. 12 may be an electronic device such as a desktop or workstation computer, a mobile computing device and the like. As is apparent from the description, however, embodiments of the invention may be implemented in any appropriately configured electronic device or computing system, as described herein.

As shown in FIG. 12, the computer system includes at least one system processor 42, which is coupled to a Read-Only Memory (ROM) 40 and a system memory 46 by a processor bus 44. System processor 42, which may, though it is certainly not required to, comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

The computer system further includes Industry Standard Architecture (ISA) bus 62, which is coupled to PCI local bus 50 by ISA bridge 64. Coupled to ISA bus 62 is an input/output (I/O) controller 70, which controls communication between the computer system and attached peripheral devices such as a keyboard, mouse, serial and parallel ports, etc. A disk controller 72 connects a disk drive with PCI local bus 50. The USB Bus and USB Controller (not shown) are part of the Local PCI controller (52).

It should be noted that, as will be appreciated by one skilled in the art, aspects of the invention may be embodied as a system, apparatus, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible device that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to embodiments of the invention. It will be understood that block(s) of the flowchart illustrations and/or block diagrams, and combinations of block(s) in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement a function/act specified.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   one or more processors;
   a receiving module configured to receive inputs derived from an emitter configured to include one or more antennas emitting quasistatic magnetic fields;
   said emitter comprising a multi-turn loop and an integrated circuit disposed about a central part of an interior cavity of a ball, wherein said multi-turn loop is wound around an inner lining of the ball; and
   a program storage device tangibly storing a program of instructions executable by the one or more processors to utilize the one or more inputs to determine an above ground position and orientation of the emitter with respect to the receiving module utilizing complex image theory, a fingerprinting technique, or the combination thereof.

2. The system according to claim 1, wherein the program of instructions further comprises computer readable program code configured to take into account an image dipole in the one or more inputs using complex image theory.

3. The system according to claim 1, wherein the inputs derived from the emitter correspond to one or more of a magnitude and a direction of the quasistatic fields produced by the emitter.

4. The system according to claim 1, wherein the multi-turn loop is positioned around a core of a magnetic material such as ferrite.

5. The system according to claim 1, wherein the emitter weighs approximately 1 oz or less.

6. The system according to claim 1, wherein the emitter is powered by one or more of batteries, ultracapacitors, or a wireless mechanism.

7. The system according to claim 1, wherein:
   the receiving module receives inputs at two or more frequencies from the emitter; and
   the instructions are further executable by the processor to utilize the inputs at two or more frequencies to determine the above ground position of the emitter.

8. An apparatus comprising:
   an above ground emitter including one or more antennas configured to emit quasistatic magnetic fields measurable by one or more antennas placed at least 25 yards away from the emitter and suitable for the detection and tracking of the emitter's position and orientation by the one or more antennas placed at least 25 yards away from the emitter;
   said emitter comprising a multi-turn loop and an integrated circuit disposed about a central part of an interior cavity of a ball, wherein said multi-turn loop is wound around an inner lining of the ball.

9. The apparatus according to claim 8, wherein the quasistatic magnetic fields are those of a magnetic dipole.

10. The apparatus according to claim 8, wherein the multi-turn loop is positioned around a core of a magnetic material such as ferrite.

11. The apparatus according to claim 8, wherein the ball is selected from the group consisting of an American football, a basketball, and a soccer ball.

12. The apparatus according to claim 8, wherein the one or more antennas emit quasistatic magnetic fields at two or more frequencies.

13. A method comprising:

receiving inputs derived from an emitter configured to emit quasistatic magnetic fields;

said emitter comprising a multi-turn loop and an integrated circuit disposed about a central part of an interior cavity of a ball, wherein said multi-turn loop is wound around an inner lining of the ball; and utilizing a subset of the inputs to determine an above ground position and orientation of the emitter utilizing complex image theory, a fingerprinting technique, or the combination thereof.

14. The method according to claim 13, wherein:

the receiving comprises receiving inputs at two or more frequencies; and the utilizing comprises using the inputs at two or more frequencies to determine the above ground position of the emitter.

15. A computer program product comprising:

a computer readable storage medium having computer readable program code embodied therewith, the computer readable program code comprising:

computer readable program code configured to receive inputs derived from quasistatic magnetic field data emitted from an emitter;

said emitter comprising a multi-turn loop and an integrated circuit disposed about a central part of an interior cavity of a ball, wherein said multi-turn loop is wound around an inner lining of the ball; and computer readable program code configured to utilize the inputs to determine an above ground position and orientation of the emitter with respect to a receiving module utilizing complex image theory, a fingerprinting technique, or the combination thereof.

16. The computer program product according to claim 15, wherein:

the computer readable program code configured to receive inputs comprises computer readable program code configured to receive inputs at two or more frequencies; and the computer readable program code configured to utilize the inputs to determine an above ground position and orientation of the emitter comprises computer readable program code configured to use the inputs at two or more frequencies to determine the above ground position of the emitter.

* * * * *